(12) United States Patent
Muñoz De Diego et al.

(10) Patent No.: US 11,912,812 B2
(45) Date of Patent: Feb. 27, 2024

(54) STABLE MODIFIED POLYMER POLYOL DISPERSIONS

(71) Applicant: REPSOL, S.A, Madrid (ES)

(72) Inventors: César Muñoz De Diego, Móstoles (ES); José Román Galdámez Peña, Móstoles (ES); Victoria Isabel Blasco Garcés, Móstoles (ES); Olivier Lemoine, Rouen (FR)

(73) Assignee: REPSOL, S.A., Madrid (ES)

( * ) Notice: Subject to any disclaimer, the term of this patent is extended or adjusted under 35 U.S.C. 154(b) by 273 days.

(21) Appl. No.: 17/125,719

(22) Filed: Dec. 17, 2020

(65) Prior Publication Data

US 2021/0189049 A1 Jun. 24, 2021

(30) Foreign Application Priority Data

Dec. 20, 2019 (EP) ..................................... 19383167

(51) Int. Cl.
| | | |
|---|---|---|
| C08G 18/08 | (2006.01) | |
| C07F 9/54 | (2006.01) | |
| C08G 18/38 | (2006.01) | |

(52) U.S. Cl.
CPC ........ C08G 18/0876 (2013.01); C07F 9/5407 (2013.01); C08G 18/388 (2013.01); C08G 18/3882 (2013.01)

(58) Field of Classification Search
None
See application file for complete search history.

(56) References Cited

U.S. PATENT DOCUMENTS

| | | |
|---|---|---|
| 4,843,106 A | 6/1989 | Fis et al. |
| 6,117,937 A | 9/2000 | Matsumoto et al. |
| 9,550,856 B2 | 1/2017 | Cookson et al. |
| 2009/0029043 A1 | 1/2009 | Rong et al. |
| 2010/0209613 A1 | 8/2010 | Rong et al. |
| 2011/0046305 A1 | 2/2011 | Schubert et al. |
| 2013/0203880 A1 | 8/2013 | George et al. |
| 2016/0194431 A1 | 7/2016 | Amici-Kroutilova et al. |
| 2021/0130528 A1 | 5/2021 | Munoz De Diego et al. |
| 2021/0189053 A1 | 6/2021 | Munoz De Diego et al. |

FOREIGN PATENT DOCUMENTS

| | | | |
|---|---|---|---|
| CN | 102838712 A | 12/2012 | |
| CN | 105683237 A | 6/2016 | |
| GB | 2040299 A | 8/1980 | |
| WO | WO 92/02567 A1 | 2/1992 | |
| WO | WO-9202567 A | * 2/1992 | ......... C08G 18/0857 |
| WO | WO 2019/008140 A1 | 1/2019 | |
| WO | WO-2019008140 A1 | * 1/2019 | ......... C08G 18/0876 |

OTHER PUBLICATIONS

Communication dated Jun. 19, 2020 forwarding the extended European Search Report for European Patent Application No. 19383167. 4, 7 pages.
ISO 16000-3 Internatonal standard; Indoor Air—Part 3: Determination of formaldehyde and other carbonyl compounds in indoor air and test chamber air—active sampling method; Oct. 15, 2011; 34 pages.
ISO 16000-9 Spanish standard; UNE-EN Indoor Air—Part 9: Determination of the emission of volatile organic compounds from building products and furnishing; Emission test chamber method (ISO 16000-9:2006); Nov. 2006; 24 pages.
ISO 16000-11 Spanish standard; UNE-EN Indoor Air—Part 11: Determination of the emission of volatile organic compounds from building products and furnishing; sampling, storage of samples and preparation of test specimens (ISO 16000-11:2006); Nov. 2006; 22 pages.
International Search Report and Written Opinion dated Sep. 28, 2018 for Application No. PCT/EP2018/068391, 13 pages.
International Preliminary Report on Patentability dated Jun. 24, 2019 for Application No. PCT/EP2018/068391, 6 pages.
ASTM D-4274-16 International Standard Test Methods for testing polyurethane raw materials: Determination of hydroxyl numbers of polyols; 2017; 10 pages.
Standard UL 94; Test for flammability of plastic materials for parts in devices and appliances; May 22, 2001; ISBN 0-7629-0082-2; 52 pages.
Standard UL 94; Test for flammability of plastic materials for parts in devices and appliances; Mar. 28, 2013; revised Jun. 27, 2020; 42 pages.
ISO 845 Spanish standard; UNE-EN Cellular plastics and rubbers Determination of apparent density (ISO 845:2006); Feb. 2010; 13 pages.
ISO 1856 Spanish standard; UNE-EN Flexible cellular polymeric materials Determination of compression set (ISO 1856:2018); Jun. 2019; 12 pages.
ISO 3386-1 Spanish standard; UNE-EN Polymeric materials, cellular flexible Determination of stress-strain characteristics in compression (ISO 3386-1:1986); Sep. 1998; 11 pages.
ISO 8307 Spanish standard; UNE-EN Flexible cellular polymeric materials Determination of resilience by ball rebound (ISO 8307:2018); Jun. 2019; 15 pages.
Communication dated Jun. 16, 2020 forwarding the extended European Search Report for European Patent Application No. 19383166. 6, 9 pages.

\* cited by examiner

*Primary Examiner* — Christopher M Rodd
(74) *Attorney, Agent, or Firm* — Squire Patton Boggs (US) LLP

(57) ABSTRACT

The present invention relates to new stable modified polymer polyol dispersions. The modified polymer polyols of the present invention comprise at least one polyol and a stable dispersion of polymeric particles in the at least one polyol. There are also disclosed processes for the preparation of the herein described modified polymer polyols, and processes for preparing polyurethane materials containing them.

15 Claims, No Drawings

STABLE MODIFIED POLYMER POLYOL DISPERSIONS

CROSS-REFERENCE

This application claims the benefit of and priority to European Patent Application EP19383167.4 filed on Dec. 20, 2019, incorporated herein by reference in entirety.

The present disclosure relates to stable modified polymer polyol dispersions and methods for the preparation thereof. Since the modified polymer polyols of the present disclosure are useful in the preparation of polyurethane foams, the present disclosure also relates to polyurethane foams which shows a low release of formaldehyde from the foams.

BACKGROUND ART

Various types of modified polymer polyols are used as raw materials for manufacturing flexible polyurethane foam and other polyurethane products. They have a continuous phase made up of one or more compounds having multiple hydroxyl groups ("base polyol") into which another polymer is dispersed in the form of particles.

Thus, example of modified polymer polyols are:

Poly Harnststoff Dispersion (PHD) polyols which are modified polymer polyols which comprise in a dispersed form a polyurea which is the polycondensation reaction product of a polyamine with a polyfunctional isocyanate;

Graft polyether polyols which are synthesised by in situ radical polymerisation of vinylic monomers in liquid polyethers, by batch, semi-continuous or continuous process wherein the vinylic monomer is generally selected from acrylonitrile, styrene, alpha-methyl styrene methylmethacrylate, hydroxyalkyl acrylates and methacrylates, vinyl chloride and others;

Polyisocyanate Polyaddition (PIPA) polymer polyols which are dispersions of polyurethane and/or polyurethane-urea particles in a liquid polyether polyol, resulting from the polymerization of an alkanolamine with an organic polyisocyanate in the presence of a polyol;

and most recently described, polymer polyols comprising a polyether carbonate polyol as the base polyol, the polyether carbonate polyols (POPC) being obtainable by a process comprising copolymerizing one or more H-functional initiator substances, one or more alkylene oxides and carbon dioxide in the presence of a double metal cyanide catalyst (DMC).

In our previous patent application WO2019008140, were disclosed new modified polymer polyols comprising at least one base polyol and a stable dispersion of polymeric particles in the at least one base polyol, the modified polymer polyol being obtainable by a process comprising the preparation of the polymeric particles in the presence of the at least one base polyol by a polycondensation reaction of a) at least one compound bearing at least one basic-nitrogen atom characterized by the presence in the molecule of at least one hydrogen atom attached to a nitrogen atom; with b) at least one compound bearing a phosphorus atom selected from the group consisting of b1) a compound bearing a phosphorus atom which is selected from the groups consisting of at least one hydroxyalkylphosphine, at least one hydroxyalkylphosphonium salt, at least one hydroxyalkylphosphine oxide and a combination thereof; or b2) a condensation product from the mixture of compounds b1) and at least one compound bearing at least one basic nitrogen atom.

The modified polymer polyols thus obtained show improved flame retardant properties, so these polyols are particularly suitable for the preparation of polyurethane foams with flame-proofing properties.

Nevertheless, it has been observed that polyurethane foams prepared from the modified polymer polyols as disclosed in the above mentioned prior art show a formaldehyde release well above the current limits for flexible polyurethane foams emmisions described in the CertiPUR label given to those foams certified and conform to the CertiPUR standard methods of Europur for testing, analysis and certification for the environment, health and safety properties of polyurethane foams used in bedding and upholstered furniture applications (10 µg/m$^3$).

Exposure to formaldehyde may cause adverse health effects. Formaldehyde is a highly reactive, acutely toxic gas and a genotoxic carcinogen. Formaldehyde can cause irritation of the skin, eyes, nose, and throat. According to several studies, high levels of exposure may cause some types of cancers.

Thus, there exists a need to provide an improved method of preparation of stable modified polymer polyols comprising at least one base polyol and a stable dispersion of polymeric particles in the at least one base polyol. Particularly, those stable modified polymer polyols which are useful to prepare polyurethane foams, adhesives, elastomers, sealings and coatings showing a low formaldehyde release and with flame retardant properties.

More particularly, those modified polymer polyol dispersions wherein the dispersed polymeric particles have a high content of P and N, and wherein the resulting modified polymer polyol dispersion is useful to prepare polyurethane materials showing low formaldehyde release.

SUMMARY

The inventors have found that the use of a liquid polyol mixture comprising a base polyol and a monofunctional polyetheramine; wherein in a preferred embodiment, the monofunctional polyetheramine has a propylene oxide content from 30 and 99 wt %, for the preparation of the modified polymer polyol dispersions, the resulting modified polymer polyol dispersion shows an improvement in its stability, i.e. the modified polymer polyol dispersion does not settle out during storage for a longer period of time, or at least will remain in dispersion during mixing with other foam forming ingredients.

The above mentioned improvement in stability is high when it is used an ethylene oxide or propylene oxide capped polyether polyol, preferably an ethylene oxide capped polyether polyol, having a proportion of terminal primary hydroxyl groups, as measured by NMR-13C, from 35 to 99.9%, from 35 to 98%, from 40 to 95%, from 45 to 90%, from 50 to 85%, from 75 to 99%, from 77 to 98% or from 78 to 95% as the base polyol. In accordance with some particular embodiments, optionally in combination with one or more features of the various embodiments described above or below, the base polyol is a polyether polyol having a content of polyethylene oxide terminal blocks of 5-20 wt %, preferably 10-19.5 wt %, preferably from 12-19 wt % and more preferably from 13-18 wt %.

In accordance with a particular embodiment, the modified polymer polyol dispersions are those resulting from the mixture of hydroxyalkylphosphine and its derivatives as polymeric particle precursors; preferably [bis(hydroxymethyl)phosphanyl]metanol (THP, also known as tris(hydroxymethyl)phosphine) and its derivatives such as oxides, salts and hemiformals.

It is known that when a tetrakis(hydroxymethyl)phosphonium salt (THPX) is reacted with a base (e.g. KOH), then it may be obtained a mixture of THP, formaldehyde, the salt KX and water; additionally, depending on the basic conditions used, [bis(hydroxymethyl)phosphoryl]methanol (THPO, also known as tris(hydroxymethyl) phosphine oxide) may also be obtained as co-product together with THP; besides, THP and THPO may react with formaldehyde forming the corresponding hemiformals (mono-, di- and tri-substituted hemiformals of THP and THPO can be found as reaction products); also non reacted THPX may be present in the reaction media in combination with the obtained products. Therefore, the product of the reaction between THPX and a base, depending on the conditions used, may be a complex mixture of compounds bearing a phosphorus atom (THP, THPO, their corresponding hemiformals and unreacted THPX), water, the corresponding salt and formaldehyde.

Chemical name and structure of the above mentioned THP, THPX, THPO, and mono-, di- and tri-substituted hemiformals of THP and THPO (mTHP, dTHP, tTHP, mTHPO and dTHPO) are as follows:

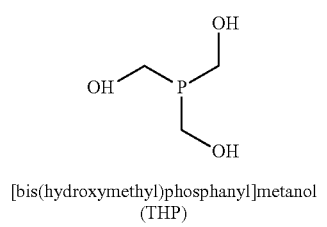

[bis(hydroxymethyl)phosphanyl]metanol
(THP)

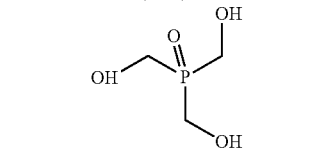

[bis(hydroxymethyl)phosphoryl]methanol
(THPO)

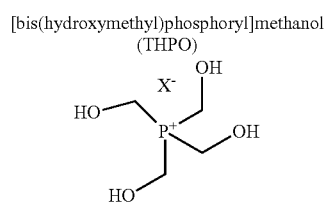

tetrakis(hydroxymethyl)phosphonium salt
(THPX)

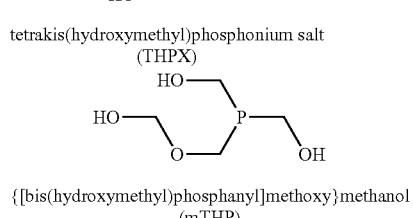

{[bis(hydroxymethyl)phosphanyl]methoxy}methanol
(mTHP)

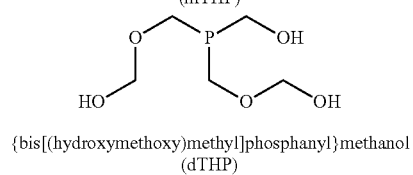

{bis[(hydroxymethoxy)methyl]phosphanyl}methanol
(dTHP)

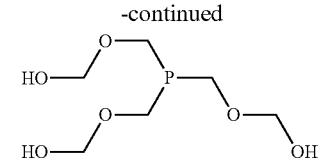

({bis[(hydroxymethoxy)methyl]phosphanyl}methoxy)methanol
(tTHP)

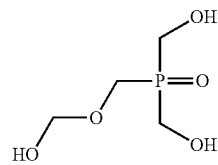

{[bis(hydroxymethyl)phosphoryl]methoxy}methanol
(mTHPO)

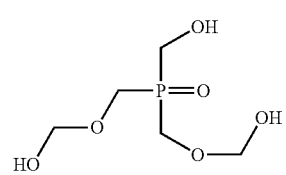

{bis[(hydroxymethoxy)methyl]phosphoryl}methanol
(dTHPO)

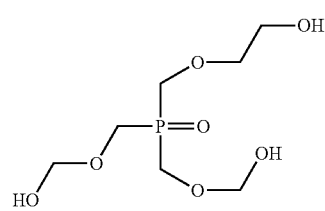

({bis[(hydroxymethoxy)methyl]phosphoryl}methoxy)methanol
(tTHPO)

As noted above, it is desirable to reduce the formaldehyde release of polyurethane materials prepared using the modified polymer polyols, without compromising its stability, i.e. without the agglomeration and precipitation of the polymeric particles.

The free formaldehyde content can be reduced form the mixture of phosphorous-containing components, i.e. the mixture of THP, its salts, oxide and/or hemiformals, by distillation. The volatile compounds, including the formaldehyde, can be distilled off at reduced or atmospheric pressure at a distillation temperature from 50-120° C. Unfortunately, the use of the resulting mixture of phosphorous-containing components in the preparation of the modified polymer polyols according to the methodology described in the patent application WO2019008140 leads to a non-stable modified polymer polyol due to the agglomeration and precipitation of the polymer particles.

Therefore, in accordance with a first aspect of the present invention, there are provided new stable modified polymer polyol dispersions of polymeric particles in a liquid polyol mixture, the stable modified polymer polyol dispersions are obtainable by a process comprising the preparation of polymeric particles, in the presence of the liquid polyol mixture, by reacting in the liquid polyol mixture and under polymerisation conditions, at least one compound bearing at least one basic-nitrogen atom a.1) characterized by the presence in the molecule of at least one hydrogen atom attached to a nitrogen atom;
with
a mixture a.2) of compounds bearing a phosphorus atom comprising [bis(hydroxymethyl)phosphanyl]methanol (THP) and optionally any of its derivatives such as a tetrakis(hydroxymethyl) phosphonium salt (THPX), [bis(hydroxymethyl)phosphoryl]methanol (THPO) and its mono-, di- or tri-hemiacetals ({[bis(hydroxymethyl)phosphanyl]methoxy}methanol (mTHP), {bis[(hydroxymethoxy)methyl]phosphanyl}methanol (dTHP), {bis[(hydroxymethoxy)methyl]phosphanyl}methoxy)methanol (tTHP), {[bis(hydroxymethyl)phosphoryl]methoxy}methanol (mTHPO), {bis[(hydroxymethoxy)methyl]phosphoryl}methanol (dTHPO) and ({bis[(hydroxymethoxy)methyl]phosphoryl}methoxy)methanol (tTHPO); or
the mixture of condensation products a.3) resulting from the reaction of the mixture of compounds bearing a phosphorus atom a.2) as described above and the at least one compound bearing at least one basic nitrogen atom a.1),
wherein the compound bearing at least one basic-nitrogen atom a.1) is selected from
melamine, trimethylol melamine;
those compounds of formula (I) or formula (II); and mixtures thereof;
wherein the compounds of formula (I) are as follows $$R_1\text{—}NH_2 \quad (I)$$

wherein $R_1$ is selected from —H, $(C_1\text{-}C_3)$Alkyl, $(C_1\text{-}C_3)$Alkyl-CO—, $NH_2$—CO—, —$(CH_2)_n$—$NH_2$, —CN, —$NH_2$, —$SO_2NH_2$, cyclohexyl, phenyl, —$SO_2OH$ and —$NHCONHNH_2$, wherein n is an integer from 1-18; 
and the compounds of formula (II) are as follows:

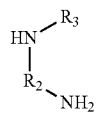 (II)

wherein $R_2$ is selected from NH=C<, O=C< and S=C<, and $R_3$ is selected from H, —CN, —$NH_2$, —$CONH_2$, —$CONHCONH_2$, and —$CONHCONHCONH_2$;
wherein the liquid polyol mixture comprises at least one base polyol and at least one monofunctional polyetheramine, the monofunctional polyetheramine having a propylene oxide content from 30-99 wt %.

The stable modified polymer polyol dispersion thus obtained is suitable for producing polyurethane materials with a reduced formaldehyde release.

In accordance with another aspect of the present invention, it is provided a process for the preparation of a modified polymer polyol dispersion, the process comprising mixing simultaneously or sequentially in any order:
I. a polymeric particle precursor comprising the mixture of
   a) the at least one compound bearing at least one basic-nitrogen atom a.1) and
   b) at least one of the group consisting of the mixture of compounds bearing a phosphorus atom a.2) or the mixture of condensation products a.3) as defined above;
II. at least one base polyol;
III. at least one monofunctional polyetheramine having a propylene oxide content from 30-99 wt %.

In another aspect of the present disclosure, it is provided a process for preparing a polyurethane material wherein at least one polyisocyanate is reacted with an isocyanate-reactive component which comprises at least one stable modified polymer polyol dispersion as described herein, the reaction optionally being carried out in the presence of water and additives such as at least one blowing agent, at least one catalyst and tensioactive products.

Another aspect of the present disclosure provides a polyurethane material obtainable by a process comprising the reaction of at least one polyisocyanate component, with an isocyanate-reactive component which comprises at least one of the herein disclosed polymer modified polyol, in the presence of at least one catalyst and optionally at least one blowing agent.

Additional aspects of the present disclosure refer to an injection molding composition or an article of manufacture comprising the polyurethane material as mentioned above.

Another aspect of the present disclosure refers to a method for reducing the emission of formaldehyde from a polyurethane foam by using a modified polymer polyol dispersion as defined herein.

It is also an object of the present invention to provide a method for the preparation of a polyurethane foam with a formaldehyde emission lower than 100 ($\mu g/m^3$), preferably bellow 10 ($\mu g/m^3$) as measured by UNE-ISO 16000-[Items 3, 9 and 11] standard method, following the indications of the CertiPUR Label for Flexible Polyurethane Foams. The method comprises the use of the stable modified polymer polyol dispersion as described herein in the preparation of the polyurethane foam.

DETAILED DESCRIPTION

In accordance with certain embodiments, optionally in combination with one or more features of the various embodiments described above or below, the free formaldehyde content of the modified polymer polyols is from 0-500 ppm, preferably from 1-300 ppm, from 2-200 ppm, from 3-100 ppm, from 4-90 ppm, or from 5-80 ppm. Wherein the formaldehyde content in the modified polymer polyol is determined following a process as described bellow.

With regard to the base polyol used in the preparation of the modified polymer polyol dispersion and/or the polyurethane material, in accordance with one particular embodiment, optionally in combination with one or more features of the various embodiments described above or below, this base polyol may be of any suitable kind. Representative base polyols useful in the preparation of the modified polymer polyol may include any kind of polyol that is known in the art and includes those described herein and any other commercially available polyol. Representative polyols include polyether polyols, polyester polyols, polymer polyols, polyhydroxy-terminated acetal resins, hydroxyl-terminated amines, polyalkylene carbonate-based polyols, acrylic polyols, polyphosphate-based polyols, and polyols comprising a polyether carbonate polyol (POPC). Suitable polymer polyols include PDH polyols, PIPA polyols, SAN polyols, copolymer polyols and polymer polyols comprising a polyether carbonate polyol (POPC) as the base polyol. All types of other polyols like polyols derived from renewable resources (so called natural oil polyols or NOP's) can also be used pure or in mixtures as long as they have the right physico—chemical features.

In accordance with an embodiment, optionally in combination with one or more features of the various embodiments described above or below, preferred base polyols are selected from polyether polyols, PDH polyols, PIPA polyols, SAN polyols, and polyols comprising a polyether carbonate polyol (POPC). Some particularly preferred base polyols are selected from polyether carbonate polyols (POPC) and polyether polyols.

In accordance with one particular embodiment, optionally in combination with one or more features of the various embodiments described above or below, the base polyol is a polyether polyol; preferably an ethylene oxide or propylene oxide capped polyether polyol; more preferably an ethylene oxide capped polyether polyol, having a proportion of terminal primary hydroxyl groups between 35 to 99.9% as measured by NMR-13C In one particular embodiment, optionally in combination with one or more features of the various embodiments described above or below, the proportion of terminal primary hydroxyl groups of the ethylene oxide capped polyether polyol as measured by NMR-13C, is from 35 to 99.9%, from 35 to 98%, from 40 to 95%, from 45 to 90%, from 50 to 85%, from 75 to 99%, from 77 to 98% or from 78 to 95% as the base polyol. In accordance with some particular embodiments, optionally in combination with one or more features of the various embodiments described above or below, the base polyol is a polyether polyol having a content of polyethylene oxide terminal blocks of 5-20 wt %, preferably 10-19.5 wt %, preferably from 12-19 wt % and more preferably from 13-18 wt %.

In accordance with one particular embodiment, optionally in combination with one or more features of the various embodiments described above or below, suitable base polyols may have an OH functionality from 2 to 10, in other particular embodiments the OH functionality is from 2 to 8, more particularly from 2 to 6, even more particularly from 3 to 6. In some particular embodiments the OH functionality is 2, 3, 4, 5, 6, 7, 8, 9 or 10.

In another particular embodiment, optionally in combination with one or more features of the various embodiments described above or below, suitable base polyols may have a molecular weight (MW) in the range of 150 to 12000, particularly in the range from 200 to 11500, more particularly from 250 to 10500. In certain embodiments, optionally in combination with one or more features of the various embodiments described above or below, suitable base polyols may have a MW in the range from 300 to 4000, particularly from 350 to 2000, more particularly from 400 to 1000. In other particular embodiments, optionally in combination with one or more features of the various embodiments described above or below, the base polyols may have a MW in the range from 3000 to 12000, particularly in the range from 4500 to 12000, more particularly from 4600 to 10000, or even more particularly from 5000 to 9000. Some particular embodiments, optionally in combination with one or more features of the various embodiments described above or below, refer to base polyols having a molecular weight (MW) in the range from 400 to 3000; alternatively in certain particular embodiments the base polyols have a molecular weight in the range from 4500 to 12000.

In accordance with certain embodiments, optionally in combination with one or more features of the various embodiments described above or below, viscosity at 25° C. of the base polyols ranges from 50 to 25000 mPa s, particularly from 65 to 9500 mPa s, more particularly from 150 to 8000 mPa s, and even more particularly from 250 to 6500 mPa s; and in other particular embodiments from 400 to 1300 mPa s.

In certain embodiments, optionally in combination with one or more features of the various embodiments described above or below, the hydroxyl number (iOH) of the base polyols ranges from 5 to 1800 mg KOH/g, from 5 to 1500 mg KOH/g, from 7 to 1400 mg KOH/g, from 8 to 1300 mg KOH/g, from 9 to 1200 mg KOH/g, or from 10 to 1100 mg KOH/g. In other embodiments the iOH of the base polyols ranges from 5 to 800 mg KOH/g, from 10 to 600 mg KOH/g, from 15 to 500 mg KOH/g, from 25 to 460 mg KOH/g. In certain particular embodiments the iOH of the base polyols ranges from 20 to 80 mg KOH/g, from 25 to 70 mg KOH/g, from 26 to 65 mg KOH/g or 26 to 58 mg KOH/g. Whereas in certain embodiments, the iOH of the base polyols ranges from 80 to 700 mg KOH/g, from 81 to 650 mg KOH/g, from 90 to 550 mg KOH/g, from 120 to 520 mg KOH/g. In some examples the iOH of the base polyols ranges from 28-280 mg KOH/g; in accordance with additional examples the iOH ranges from 28-56 mg KOH/g and in further examples the iOH ranges from 160-490 mg KOH/g.

In one particular embodiment, optionally in combination with one or more features of the various embodiments described above or below, the polyether polyols are ethylene oxide capped polyether polyols having a proportion of terminal primary hydroxyl groups from 35-99.9%, a MW in the range of 4500 to 12000; an iOH in the range of 26 to 37 mg KOH/g, with a content of polyethylene oxide terminal blocks of 5-20 wt %, preferably 10-19.5 wt %, preferably from 12-19 wt % and more preferably from 13-18 wt %.

The modified polymer polyols according to the present invention show dispersion stability. For the purposes of the invention, the term "dispersion stability" refers to the ability of the dispersion of polymeric particles in the mixture of the at least one base polyol and the at least one monofunctional polyetheramine, to resist change in its properties over a defined period of time under ambient conditions, i.e. no particle size increase phenomena (such as coalescence or flocculation) or migration phenomena (such as sedimentation or creaming) is observed. In the context of the present invention, the term "a stable polymeric particle dispersion particles in a mixture of at least one base polyol and at least one monofunctional polyetheramine" refers to a dispersion of polymeric particles in the base polyol-monofunctional polyetheramine mixture which does not settle out, or at least which will remain in dispersion during mixing with other foam forming ingredients The modified polymer polyols of the invention are stable under storage conditions.

Therefore, in accordance with the present invention, the monofunctional polyetheramine having a propylene oxide content from 30 and 99 wt % is used as a dispersant in order to improve the stability of the modified polymeric polyols.

According to certain embodiments, optionally in combination with one or more features of the various embodiments described above or below, the dispersant is selected from a monofunctional polyetheramine having a propylene oxide content from 30 and 99 wt %, from 35 and 98 wt %, from 40 and 97 wt %, from 45 and 96 wt %, from 50 and 95 wt %. In certain particular embodiments, optionally in combination with one or more features of the various embodiments described above or below, the monofunctional polyetheramine has a propylene oxide content from 75 and 99 wt %, particularly from 80 and 90 wt %, more particularly from 82 and 88 wt %.

In certain embodiments, optionally in combination with one or more features of the various embodiments described above or below, the monofunctional polyetheramines has an average molecular weight of from 400 to 2500, in particular embodiments ranges from 450 to 2200, and more particularly from 600 to 2000.

In another particular embodiments, optionally in combination with one or more features of the various embodiments described above or below, the monofunctional polyetheramines has a PO:EO (propylene oxide:ethylene oxide) mol ratio of from 3:1 to 20:1, more particularly from 4.5:1 to 12:1. In certain particular embodiments the monofunctional polyetheramines has a PO:EO ratio of 9:1 and an average molecular weight of 600; in another suitable embodiments have a PO:EO ratio of 29:6 and an average molecular weight of 2000. Some particular examples of monofunctional polyetheramines are available under the tradename Jeffamine® (M series) from Huntsman.

According to certain embodiments, optionally in combination with one or more features of the various embodiments described above or below, the monofunctional polyetheramine is present in the liquid polyol mixture in a concentration with respect to the total of the liquid polyol mixture ranging from 0.1 wt % to 40 wt %, from 0.3 wt % to 30 wt %, from 0.5 wt % to 25 wt %, from 1 wt % to 10 wt %, from 2 to 5 wt %

It is well known in the art to use mixed polyols to vary the reactivity of the system or impart desired properties to the resulting polyurethanes. Therefore, in accordance with an embodiment of the present disclosure, mixtures of base polyols, mixtures of polymer polyols or mixtures of base and polymer polyols may also be used.

In accordance with some embodiments, optionally in combination with one or more features of the various embodiments described above or below, the mixture of compounds bearing a phosphorus atom comprises a tetrakis (hydroxymethyl)phosphonium salt (THPX) in a concentration from 0-50 mol %; wherein the countercation (X) of the salt is a monovalent, bivalent or trivalent ligand selected from chloride, bromide, iodide, sulphate, phosphate, hydrogen phosphate, dihydrogen phosphate, hydroxyde, acetate, oxalate and citrate.

In certain embodiments, optionally in combination with one or more features of the various embodiments described above or below, the hydroxyalkylphosphonium salt is selected from: tetrakis(hydroxymethyl) phosphonium chloride (THPC), bis[tetrakis(hydroxymethyl) phosphonium] sulphate (THPS), tetrakis(hydroxymethyl) phosphonium phosphate (THPP (3:1)), tetrakis(Hydroxymethyl)phosphonium monohydrogen phosphate (THPP (2:1)), tetrakis(Hydroxymethyl)phosphonium dihydrogen phosphate (THPP (1:1)), tetrakis(hydroxymethyl) phosphonium hydroxide (THPOH), tetrakis(hydroxymethyl) phosphonium oxalate (THPOx) and tetrakis(hydroxymethyl) phosphonium acetate (THPA).

Particular examples of hydroxyalkylphosphonium salts are tetrakis(hydroxymethyl) phosphonium chloride (THPC) and bis[tetrakis(hydroxymethyl) phosphonium] sulphate (THPS).

In accordance with some embodiments, optionally in combination with one or more features of the various embodiments described above or below, the stable modified polymer polyol dispersions are obtainable by a process comprising the preparation of polymeric particles, in the presence of the liquid polyol mixture, by reaction of
  at least one compound bearing at least one basic-nitrogen atom a.1) which is selected from melamine, trimethylol melamine, the compounds of formula (I) or formula (II) as defined above and mixtures thereof; with
  the mixture of compounds bearing a phosphorus atom a.2) comprising
    I. [bis(hydroxymethyl)phosphanyl]methanol (THP) in a concentration from 0-99.9 mol %,
    II. a tetrakis(hydroxymethyl) phosphonium salt (THPX) in a concentration from 0-50 mol %,
    III. [bis(hydroxymethyl)phosphoryl]methanol (THPO) in a concentration from 0-99.9 mol %,
    IV. {[bis(hydroxymethyl)phosphanyl]methoxy}methanol (mTHP) in a concentration from 0-80 mol %,
    V. {bis[(hydroxymethoxy)methyl]phosphanyl}methanol (dTHP) in a concentration from 0-30 mol %,
    VI. ({bis[(hydroxymethoxy)methyl]phosphanyl}methoxy)methanol (tTHP) in a concentration from 0-15 mol %;
    VII. {[bis(hydroxymethyl)phosphoryl]methoxy}methanol (mTHPO) in a concentration from 0-20 mol %;
    VIII. {bis[(hydroxymethoxy)methyl]phosphoryl}methanol (dTHPO) in a concentration from 0-10 mol %;
    IX. ({bis[(hydroxymethoxy)methyl]phosphoryl}methoxy)methanol (tTHPO) in a concentration from 0-4 mol %; and
    X. optionally at least one other compound bearing a phosphorus atom; being the sum total of compounds bearing a phosphorus atom in the mixture 100 mol %; or
  the condensation products a.3) resulting from the reaction of the mixture a.2) and at least one compound bearing at least one basic nitrogen atom a.1).

In accordance with some embodiments, optionally in combination with one or more features of the various embodiments described above or below, the modified polymer polyols are obtainable by reaction of
  the at least one compound bearing at least one basic-nitrogen atom a.1) which is selected from melamine, trimethylol melamine, the compounds of formula (I) or formula (II) as defined above or mixtures thereof; and
  the mixture of compounds bearing a phosphorus atom a.2) as defined above.

In accordance with certain embodiments, optionally in combination with one or more features of the various embodiments described above or below, the mixture of compounds bearing a phosphorus atom a.2) comprises:
  I. [bis(hydroxymethyl)phosphanyl]methanol (THP) in a concentration from 0-99.9 mol %, from 20-95 mol %, from 30-90 mol %; from 35-85 mol %, from 50-75 mol % or from 60-72 mol %;
  II. a tetrakis(hydroxymethyl) phosphonium salt (THPX) in a concentration from 0-50 mol %, from 0-30 mol %, from 0.05-15 mol %, from 0.1-10 mol %, from 0.1-7.5 mol %, from 0.2-5 mol %, or from 0.5-6.6 mol % THPX;
  III. [bis(hydroxymethyl)phosphoryl]methanol (THPO) in a concentration from 0-99.9 mol %, from 0-40 mol %, from 1-15 mol %, from 2-12 mol %, or from 2-7 mol % THPO;
  IV. {[bis(hydroxymethyl)phosphanyl]methoxy}methanol (mTHP) in a concentration from 0-80 mol %, from 0.1-60 mol %, from 0.2-45 mol %, from 0.4-40 mol %, from 0.5-30 mol %, or from 1-25 mol % mTHP;

V. {bis[(hydroxymethoxy)methyl]phosphanyl}methanol (dTHP) in a concentration from 0-30 mol %, from 0.1-20 mol %, from 0.2-15 mol % or from 0.25-10 mol % dTHP;

VI. ({bis[(hydroxymethoxy)methyl]phosphanyl}methoxy)methanol (tTHP) in a concentration from 0-15 mol %, from 0.05-5 mol %, from 0.075-2 mol %, or from 0.1-1 mol % tTHP;

VII. bis(hydroxymethyl)phosphorylmethoxymethanol (mTHPO) in a concentration from 0-20 mol %, from 0.05-10 mol %, from 0.1-6.5 mol %, from 0-6.1 mol % mTHPO;

VIII. {bis[(hydroxymethoxy)methyl]phosphoryl}methanol (dTHPO) in a concentration from 0-10 mol %, from 0.05-5 mol %, from 0.1-1 mol % dTHPO; and IX. ({bis[(hydroxymethoxy)methyl]phosphoryl}methoxy)methanol (tTHPO) in a concentration from 0-4 mol %, from 0.01-1 mol %, from 0.05-0.2 mol % tTHPO; and X. optionally at least one other compound bearing a phosphorus atom;

being the sum total of compounds bearing a phosphorus atom in the mixture 100 mol %.

In accordance with certain particular embodiments, optionally in combination with one or more features of the various embodiments described above or below, the modified polymer polyols are obtainable by reaction of
the at least one compound bearing at least one basic-nitrogen atom a.1) which is selected from:
melamine, trimethylol melamine
those compounds of formula (I) wherein R1 is selected from H, methyl, —CN, CH₃CO—, NH₂—CO—;
those compounds of formula (II) wherein R2 is selected from O═C<; S═C<; and R3 es H; and
mixtures thereof
and
the mixture of compounds bearing a phosphorus atom a.2) which comprises:
I. [bis(hydroxymethyl)phosphanyl]metanol (THP) in a concentration from 35-85 mol %, from 50-75 mol %, or from 60-72 mol %;
II. a tetrakis(hydroxymethyl) phosphonium salt (THPX) in a concentration from 0-30 mol %, from 0.1-10 mol %, from 0.1-7.5 mol %, from 0.2-5 mol %, or from 0.5-6.6 mol %;
III. [bis(hydroxymethyl)phosphoryl]methanol (THPO) in a concentration from 0-40 mol %, from 1-15 mol %, from 2-12 mol %, or from 2-7 mol %
IV. {[bis(hydroxymethyl)phosphanyl]methoxy}methanol (mTHP) in a concentration concentration from 0-80 mol %, from 0.4-40 mol %, from 0.5-30 mol %, or from 1-25 mol %;
V. {bis[(hydroxymethoxy)methyl]phosphanyl}methanol (dTHP) in a concentration from 0-30 mol %, from 0.1-20 mol %, from 0.2-15 mol % or from 0.25-10 mol %;
VI. ({bis[(hydroxymethoxy)methyl]phosphanyl}methoxy)methanol (tTHP) in a concentration from 0-15 mol %, from 0.05-5 mol %, from 0.075-2 mol %, or from 0.1-1 mol %;
VII. bis(hydroxymethyl)phosphorylmethoxymethanol (mTHPO) in a concentration from 0-20 mol %, from 0.05-10 mol %, from 0.1-6.5 mol %, from 0-6.1 mol %;
VIII. {bis[(hydroxymethoxy)methyl]phosphoryl}methanol (dTHPO) in a concentration from 0-10 mol %, from 0.05-5 mol %, from 0.1-1 mol %; and
IX. ({bis[(hydroxymethoxy)methyl]phosphoryl}methoxy)methanol (tTHPO) in a concentration from 0-4 mol %, from 0.01-1 mol %, from 0.05-0.2 mol %; and
X. optionally at least one other phosphorus containing component; being the sum total of compounds bearing a phosphorus atom in the mixture 100 mol %

In accordance with certain particular embodiments, optionally in combination with one or more features of the various embodiments described above or below, the modified polymer polyols are obtainable by a process comprising the preparation of the polymeric particles, in the presence of the base polyol-monofunctional polyetheramine mixture as described above, by reaction of
the at least one compound bearing at least one basic-nitrogen atom a.1) which is selected from:
melamine, trimethylol melamine
those compounds of formula (I) wherein R1 is selected from H, methyl, —CN, CH₃CO—, NH₂—CO—;
those compounds of formula (II) wherein R2 is selected from O═C<; S═C<; and R3 es H; and
mixtures thereof;
and
the mixture of compounds bearing a phosphorus atom a.2) which comprises:
I. [bis(hydroxymethyl)phosphanyl]methanol (THP) in a concentration from 35-85 mol %, from 50-75 mol %, particularly from 60-72 mol %;
II. a tetrakis(hydroxymethyl) phosphonium salt (THPX) in a concentration from 0-30 mol %, from 0.1-10 mol %, particularly from 0.5-6.6 mol %;
III. [bis(hydroxymethyl)phosphoryl]methanol (THPO) in a concentration from 0-40 mol %, from 1-15 mol %, particularly from 2-12 mol %;
IV. {[bis(hydroxymethyl)phosphanyl]methoxy}methanol (mTHP) in a concentration from 0-80 mol %, from 0.4-40 mol %, particularly from 1-25 mol %;
V. {bis[(hydroxymethoxy)methyl]phosphanyl}methanol (dTHP) in a concentration from 0-30 mol %, particularly from 0.25-10 mol %;
VI. ({bis[(hydroxymethoxy)methyl]phosphanyl}methoxy)methanol (tTHP) in a concentration from 0-15 mol %, particularly from 0.05-5 mol %;
VII. bis(hydroxymethyl)phosphorylmethoxymethanol (mTHPO) in a concentration from 0-20 mol %, particularly from 0.1-6.5 mol %;
VIII. {bis[(hydroxymethoxy)methyl]phosphoryl}methanol (dTHPO) in a concentration from 0-10 mol %, particularly from 0.1-1 mol %; and
IX. ({bis[(hydroxymethoxy)methyl]phosphoryl}methoxy)methanol (tTHPO) in a concentration from 0-4 mol %, particularly from 0.05-0.2 mol %; and
X. optionally at least one other compound bearing a phosphorus atom;
being the sum total of compounds bearing a phosphorus atom in the mixture 100 mol %; and
wherein the base polyol is an ethylene oxide capped polyether polyol having proportion of terminal primary hydroxyl groups from 35-99.9%, and a content of polyethylene oxide terminal blocks of 5-20 wt %, preferably 10-19.5 wt %, preferably from 12-19 wt % and more preferably from 13-18 wt %.

In accordance with certain particular embodiments, optionally in combination with one or more features of the various embodiments described above or below, the modified polymer polyols comprise a stable dispersion of polymeric particles in a mixture of at least one base polyol and at least one monofunctional polyetheramine;

wherein the base polyol is an ethylene oxide capped polyether polyol having proportion of terminal primary hydroxyl groups from 35-99.9%, a content of polyethylene oxide terminal blocks of 5-20 wt %, preferably from 10-19.5 wt %, preferably from 12-19 wt % and more preferably from 13-18 wt %, and a OH functionality from 2 to 8; and wherein the monofunctional polyetheramine has a propylene oxide content from 80-90 wt %, and a propylene oxide to ethylene oxide mol ratio from 4.5:1 to 12:1.

In accordance with some embodiments, optionally in combination with one or more features of the various embodiments described above or below, the modified polymer polyols are obtainable by reaction of the at least one compound bearing at least one basic-nitrogen atom a.1) which is selected from melamine, trimethylol melamine, those compounds of formula (I) or formula (II) as defined above, and mixtures thereof; with the mixture of condensation products a.3) as defined above.

The condensation products a.3) resulting from the reaction of the mixture a.2) and at least one compound bearing at least one basic nitrogen atom a.1) which is selected from melamine, trimethylol melamine, those compounds of formula (I) or formula (II) as described above and mixtures thereof, wherein the condensation reaction is carried out at a temperature ranging from 2-140° C., preferably from 25-120° C., more preferably from 40-100° C. and most preferably from 60 to 90° C. The skilled person in the art may know how to adjust the temperature conditions in view of the compound a.1) used in the method.

In accordance with certain particular embodiments, optionally in combination with one or more features of the various embodiments described above or below, the modified polymer polyols are obtainable by reaction of the at least one compound bearing at least one basic-nitrogen atom a.1) which is selected from:
melamine, trimethylol melamine
those compounds of formula (I) wherein R1 is selected from H, methyl, —CN, $CH_3CO$—, $NH_2$—CO—;
those compounds of formula (II) wherein R2 is selected from O=C<; S=C<; and R3 es H; and
mixtures thereof
and
the mixture of condensation products a.3) obtainable at a temperature ranging from 2-140° C., preferably from 25-120° C., more preferably from 40-100° C. and most preferably from 60 to 90° C.

In accordance with certain particular embodiments, optionally in combination with one or more features of the various embodiments described above or below, the modified polymer polyol dispersions are obtainable by reaction of the at least one compound bearing at least one basic-nitrogen atom a.1) which is selected from:
melamine, trimethylol melamine
those compounds of formula (I) wherein R1 is selected from H, methyl, —CN, $CH_3CO$—, $NH_2$—CO—;
those compounds of formula (II) wherein R2 is selected from O=C<; S=C<; and R3 es H; and
mixtures thereof
and
the mixture of condensation products a.3) as defined above;
and
wherein the base polyol is an ethylene oxide capped polyether polyol having a content of terminal primary hydroxyl groups from 35-99.9%, a content of polyethylene oxide terminal blocks of 5-20 wt %, preferably 10-19.5 wt %, preferably from 12-19 wt % and more preferably from 13-18 wt %, and a OH functionality from 2 to 8; and wherein the monofunctional polyetheramine has a propylene oxide content from 80-90 wt %, and a propylene oxide to ethylene oxide mol ratio from 4.5:1 to 12:1.

In accordance with certain embodiments, optionally in combination with one or more features of the various embodiments described above or below, suitable compounds bearing at least one basic-nitrogen atom in accordance with the present invention have a functionality greater or equal than 2. In particular embodiments, optionally in combination with one or more features of the various embodiments described above or below, the functionality is 2, 3, 4, 5, 6, 7, 8, 9, 10, 11, 12, 13, 14 or 15.

In the context of the present invention, the term "functionality" when referring to the compound bearing a basic-nitrogen atom is used herein to indicate the number average functionality (number of hydrogen atoms attached to nitrogen atoms per molecule) of the compound.

Examples of suitable compounds bearing at least one basic-nitrogen atom characterized by the presence in the molecule of at least one hydrogen atom attached to a nitrogen atom are melamine, trimethylol melamine, and those compounds of formula (I) or formula (II) as defined above. It is also possible the use a mixture of two or more of these compounds bearing at least one basic-nitrogen atom a.1).

In accordance with some particular embodiments, optionally in combination with one or more features of the various embodiments described above or below, the compounds of formula (I) are those wherein R1 is selected from H, methyl, —CN, $CH_3$—CO—; $NH_2$—CO—.

In some particular embodiments, optionally in combination with one or more features of the various embodiments described above or below, the compounds of formula (II) bearing at least one basic-nitrogen atom are those wherein R2 is selected from O=C<; S=C<; and R3 es H.

Particular examples of compounds bearing at least one basic-nitrogen atom characterized by the presence in the molecule of at least one hydrogen atom attached to a nitrogen atom are $NH_3$, primary aliphatic and alicyclic amines, aliphatic and alicyclic primary and secondary polyamines and aromatic primary, secondary and tertiary amines and polyamines, for example, cyanamide, guanidine, 2-cyanoguanidine, methylamine, ethylene diamine, diethylenetriamine, hexamethylendiamine, hydrazine, tertiary octylamine, cyclohexylamine, trimethylol melamine, urea, tiourea, aniline, and polyethyleneimines. Wherein $NH_3$, melamine, cyanamide, urea, thiourea, diethylentriamine, hydrazine and ethylene diamine are particular preferred examples.

The skilled person in the art may know the method and the suitable media in order to solubilize, if necessary, the compound bearing at least one basic-nitrogen atom.

The reaction between the at least one compound a.1) with the mixture a.2) or alternatively with the polycondensation mixture a.3), as defined above, may be carried out at temperatures from −40 to 200° C., preferably from 20 to 180° C., more preferably from 40 to 160° C. and most preferably from 60 to 140° C.

The skilled person in the art would know how to adjust the temperature and reaction time in the light of the description and examples herein described in order to complete the polycondensation reaction.

Molar ratios to be used between the phosphorus bearing compound and the compound bearing at least one basic-nitrogen atom depend on the compound bearing at least one basic-nitrogen atom functionality. The skilled person would know how to adjust the molar ratios in the light of the description and examples of the present invention in order to obtain a solid product.

The compound bearing at least one basic nitrogen atom can be added to the reactor as a solid, as a gas or dissolved in a suitable solvent. Aqueous solutions of amines are preferred.

The reaction can be carried out at atmospheric pressure, vacuum or under pressure. Besides, the reaction can be carried out under inert (nitrogen, argon) or oxidant atmosphere (air).

Stirring must be vigorous in order to guarantee the formation of particles and to avoid agglomeration of the products With regard to the specific conditions for carrying out the process of the invention, the skilled person would know how to adjust the parameters of each of the steps indicated above in the light of the description and examples of the present invention.

In certain embodiments, optionally in combination with one or more features of the various embodiments described above or below, the process for the preparation of the stable modified polymer polyol dispersions comprises a) mixing the at least one base polyol with the at least one monofunctional polyetheramine, thus obtaining a liquid polyol mixture; and b) preparing the polymeric particles by adding to the liquid polyol mixture, obtained in a), simultaneously or sequentially in any order the at least one compound bearing at least one basic-nitrogen atom a.1) characterized by the presence in the molecule of at least one hydrogen atom attached to a nitrogen atom and is selected from melamine, trimethylol melamine, the compounds of formula (I) or formula (II) as defined above and mixtures thereof; and the mixture of compounds bearing a phosphorus atom a.2) or the mixture of condensation products a.3) as defined above.

In accordance with some embodiments, optionally in combination with one or more features of the various embodiments described above or below, the process comprises:

i. mixing at least one tetrakis(hydroxymethyl) phosphonium salt (THPX) with an aqueous or alcoholic solution of a base, preferably at a temperature ranging from 0 to 60° C.;

ii. optionally filtering out the resulting solution;

iii. distilling off the solvent and volatiles, in particular formaldehyde, thus obtaining the mixture a.2) of compounds bearing a phosphorus atom as defined above;

iv. optionally filtering out the resulting solution;

v. optionally oxydizing the product obtained in iii or the solution obtained in iv, wherein the oxydation may be done by simply thermal treatment in air atmosphere or by the use of oxidants as, for example, water peroxide, thus obtaining the mixture a.2) with a high content of oxydized components;

vi. mixing the at least one base polyol with the at least one monofunctional polyetheramine, thus obtaining the liquid polyol mixture;

vii. preparing the polymeric particles in the presence of the liquid polyol mixture obtained in vi. by the reaction resulting from adding to the liquid polyol mixture obtained in vi. simultaneously or sequentially in any order the at least one compound bearing at least one basic-nitrogen atom a.1) characterized by the presence in the molecule of at least one hydrogen atom attached to a nitrogen atom and is selected from melamine, trimethylol melamine, the compounds of formula (I) or formula (II) as defined above and mixtures thereof; and the mixture of compounds bearing a phosphorus atom a.2) obtained in iii, the filtered solution obtained in iv, the oxydized mixture obtained in v, or mixtures thereof.

In accordance with certain embodiments, optionally in combination with one or more features of the various embodiments described above or below, the aqueous or alcoholic solution of a base used in step i. above may be selected from KOH, NaOH, Ca(OH)$_2$, Mg(OH)$_2$, Ba(OH)$_2$, triethylamine (NEt$_3$), tributylamine (NBu$_3$). Alternatively, the hydroxyalkylphosphonium salt may be treated with a basic ion-exchange resin. Both, strong and weak ion exchange resins are suitable for the process. Examples of strong bases would be Amberlite® IRN78 or Amberlist® A26. Examples of weak bases would be Amberlite® IRA 67, Lewatit® MP-62 and Lewatit® VP 001065.

In accordance with certain embodiments, optionally in combination with one or more features of the various embodiments described above or below, the distilling off step is performed under vacuum and at a temperature ranging from 25-99° C., preferably from 40-90° C. and more preferably from 60-80° C.

In accordance with certain embodiments, optionally in combination with one or more features of the various embodiments described above or below, the mixture of compounds bearing a phosphorus atom a.2) obtained in step iii. comprises:

I. [bis(hydroxymethyl)phosphanyl]methanol (THP) in a concentration from 0-99.9 mol %, from 20-95 mol %, from 30-90 mol %; from 35-85 mol %, from 50-75 mol % or from 60-72 mol % THP;

II. a tetrakis(hydroxymethyl) phosphonium salt (THPX) in a concentration from 0-50 mol %, from 0-30 mol %, from 0.05-15 mol %, from 0.1-10 mol %, from 0.1-7.5 mol %, from 0.2-5 mol %, or from 0.5-6.6 mol % THPX;

III. [bis(hydroxymethyl)phosphoryl]methanol (THPO) in a concentration from 0-99.9 mol %, from 0-40 mol %, from 1-15 mol %, from 2-12 mol %, or from 2-7 mol % THPO;

IV. {[bis(hydroxymethyl)phosphanyl]methoxy}methanol (mTHP) in a concentration concentration from 0-80 mol %, from 0.1-60 mol %, from 0.2-45 mol %, from 0.4-40 mol %, from 0.5-30 mol %, or from 1-25 mol % mTHP;

V. {bis[(hydroxymethoxy)methyl]phosphanyl}methanol (dTHP) in a concentration from 0-30 mol %, from 0.1-20 mol %, from 0.2-15 mol % or from 0.25-10 mol % dTHP;

VI. ({bis[(hydroxymethoxy)methyl]phosphanyl}methoxy)methanol (tTHP) in a concentration from 0-15 mol %, from 0.05-5 mol %, from 0.075-2 mol %, or from 0.1-1 mol % tTHP VII. bis(hydroxymethyl)phosphorylmethoxymethanol (mTHPO) in a concentration from 0-20 mol %, from 0.05-10 mol %, from 0.1-6.5 mol %, from 0-6.1 mol % mTHPO;

VIII. {bis[(hydroxymethoxy)methyl]phosphoryl}methanol (dTHPO) in a concentration from 0-10 mol %, from 0.05-5 mol %, from 0.1-1 mol % dTHPO; and IX. ({bis[(hydroxymethoxy)methyl]phosphoryl}methoxy)methanol (tTHPO) in a concentration from 0-4 mol %, from 0.01-1 mol %, from 0.05-0.2 mol % tTHPO; and X. optionally at least one other compound bearing a phosphorus atom; being the sum total of compounds bearing a phosphorus atom in the mixture 100 mol %

In accordance with certain particular embodiments, optionally in combination with one or more features of the various embodiments described above or below, the mixture of compounds bearing a phosphorus atom a.2) comprises:

I. [bis(hydroxymethyl)phosphanyl]methanol (THP) in a concentration from 35-85 mol %, from 50-75 mol %, particularly from 60-72 mol %;

II. a tetrakis(hydroxymethyl) phosphonium salt (THPX) in a concentration from 0-30 mol %, from 0.1-10 mol %, particularly from 0.5-6.6 mol %;

III. [bis(hydroxymethyl)phosphoryl]methanol (THPO) in a concentration from 0-40 mol %, from 1-15 mol %, particularly from 2-12 mol %;

IV. {[bis(hydroxymethyl)phosphanyl]methoxy}methanol (mTHP) in a concentration from 0-80 mol %, from 0.4-40 mol %, particularly from 1-25 mol %;

V. {bis[(hydroxymethoxy)methyl]phosphanyl}methanol (dTHP) in a concentration from 0-30 mol %, particularly from 0.25-10 mol %;

VI. ({bis[(hydroxymethoxy)methyl]phosphanyl}methoxy)methanol (tTHP) in a concentration from 0-15 mol %, particularly from 0.05-5 mol %;

VII. bis(hydroxymethyl)phosphorylmethoxymethanol (mTHPO) in a concentration from 0-20 mol %, particularly from 0.1-6.5 mol %;

VIII. {bis[(hydroxymethoxy)methyl]phosphoryl}methanol (dTHPO) in a concentration from 0-10 mol %, particularly from 0.1-1 mol %; and IX. ({bis[(hydroxymethoxy)methyl]phosphoryl}methoxy)methanol (tTHPO) in a concentration from 0-4 mol %, particularly from 0.05-0.2 mol %; and X. optionally at least one other compound bearing a phosphorus atom;

being the sum total of compounds bearing a phosphorus atom in the mixture 100 mol %;

wherein the compound bearing at least one basic-nitrogen atom a.1) is selected from:
melamine, trimethylol melamine;
those compounds of formula (I) wherein R1 is selected from H, methyl, —CN, CH$_3$CO—, NH$_2$—CO—;
those compounds of formula (II) wherein R2 is selected from O═C<; S═C<; and R3 es H; and mixture thereof.

wherein the base polyol is an ethylene oxide capped polyether polyol having a proportion of terminal primary hydroxyl groups from 35-99.9%; a content of polyethylene oxide terminal blocks of 5-20 wt %, preferably 10-19.5 wt %, preferably from 12-19 wt % and more preferably from 13-18 wt %; and a OH functionality from 2 to 8; and wherein the monofunctional polyetheramine has a propylene oxide content from 80-90 wt %, and a propylene oxide to ethylene oxide mol ratio from 4.5:1 to 12:1.

In accordance with certain particular embodiments, optionally in combination with one or more features of the various embodiments described above or below, the modified polymer polyols are obtainable by a process comprising the preparation of the polymeric particles, in the presence of the base polyol-monofunctional polyetheramine mixture as described above, by reaction of the at least one compound bearing at least one basic-nitrogen atom a.1) which is selected from:
melamine, trimethylol melamine;
those compounds of formula (I) wherein R1 is selected from H, methyl, —CN, CH$_3$CO—, NH$_2$—CO—;
those compounds of formula (II) wherein R2 is selected from O═C<; S═C<; and R3 is H; and
mixtures thereof
and
the mixture of compounds bearing a phosphorus atom a.2) obtained in step iii., which comprises:

I. [bis(hydroxymethyl)phosphanyl]methanol (THP) in a concentration from from 50-75 mol %, particularly from 60-72 mol %;

II. a tetrakis(hydroxymethyl) phosphonium salt (THPX) in a concentration from from 0.1-10 mol %, particularly from 0.5-6.6 mol %;

III. [bis(hydroxymethyl)phosphoryl]methanol (THPO) in a concentration from from 1-15 mol %, particularly from 2-12 mol %;

IV. {[bis(hydroxymethyl)phosphanyl]methoxy}methanol (mTHP) in a concentration from from 0.4-40 mol %, particularly from 1-25 mol %;

V. {bis[(hydroxymethoxy)methyl]phosphanyl}methanol (dTHP) in a concentration from 0-30 mol %, particularly from 0.2-15 mol %;

VI. ({bis[(hydroxymethoxy)methyl]phosphanyl}methoxy)methanol (tTHP) in a concentration from 0-15 mol %, particularly from 0.1-1 mol %;

VII. bis(hydroxymethyl)phosphorylmethoxymethanol (mTHPO) in a concentration from 0-20 mol %, VIII. {bis[(hydroxymethoxy)methyl]phosphoryl}methanol (dTHPO) in a concentration from 0-10 mol %;

IX. ({bis[(hydroxymethoxy)methyl]phosphoryl}methoxy)methanol (tTHPO) in a concentration from 0-4 mol %; and X. optionally at least one other compound bearing a phosphorus atom;

being the sum total of compounds bearing a phosphorus atom in the mixture 100 mol %;
and
wherein the base polyol is an ethylene oxide capped polyether polyol having a content of polyethylene oxide terminal blocks of 5-20 wt %, preferably 10-19.5 wt %, preferably from 12-19 wt % and more preferably from 13-18 wt %, a proportion of terminal primary hydroxyl groups from 35-99.9%, and a OH functionality from 2 to 8; and wherein the monofunctional polyetheramine has a propylene oxide content from 80-90 wt %, and a propylene oxide to ethylene oxide mol ratio from 4.5:1 to 12:1.

In accordance with certain particular embodiments, optionally in combination with one or more features of the various embodiments described above or below, the process comprises:
i) mixing at least one tetrakis(hydroxymethyl) phosphonium salt (THPX) with an aqueous or alcoholic solution of a base, preferably from 0 to 60° C.;
ii) optionally filtering out the resulting solution;
iii) distilling off the solvent and volatiles, thus obtaining the mixture a.2) of compounds bearing a phosphorus atom as defined above;
iv) optionally filtering out the resulting solution;
v) optionally oxydizing the product obtained in iii or the solution obtained in iv, wherein the oxidation may be performed by simple by thermal treatment in air atmosphere or by the use of oxidants as, for example, water peroxide, thus obtaining the mixture a.2) with a high content of oxydized components;
vi) reacting the mixture of compounds a.2) as obtained in iii), the filtered solution obtained in iv), the oxidized mixture as obtained in v) or mixtures thereof with at least one compound bearing at least one basic-nitrogen atom a.1) characterized by the presence in the molecule of at least one hydrogen atom attached to a nitrogen atom and is selected from melamine, trimethylol melamine, the compounds of formula (I) or formula (II) as defined above and mixtures thereof; preferably at a temperature ranging from 2 to 140° C., preferably from 25 to 120° C., more preferably from 40 to 100° C., and most preferably from 60 to 90° C. thus obtaining a mixture of condensation products a.3);
vii) mixing the at least one base polyol, which preferably is an ethylene oxide capped polyether polyol having a content of polyethylene oxide terminal blocks of 10-20 wt %, a content of terminal primary hydroxyl groups between 35-99.9%, and a OH functionality from 2 to 8; with at least one monofunctional polyetheramine having a propylene oxide content between 30-99 wt %, thus obtaining a liquid polyol mixture;
viii) preparing the polymeric particles in the presence of the liquid polyol mixture obtained in vii) by the reaction resulting from adding to the liquid polyol mixture obtained in vii), simultaneously or sequentially in any order
the at least one compound bearing at least one basic-nitrogen atom a.1) characterized by the presence in the molecule of at least one hydrogen atom attached to a nitrogen atom which is selected from melamine, trimethylol melamine, the compounds of formula (I) or formula (II) as defined above, and mixtures thereof; and
the mixture of condensation products a.3) obtained in vi).

In accordance with certain particular embodiments, optionally in combination with one or more features of the various embodiments described above or below, the condensation products resulting from the reaction of the mixture a.2) as obtained in step iii,), the filtered solution obtained in iv), the oxydized mixture a.2) as obtained in step v or mixtures thereof, and the at least one compound a.1) bearing at least one basic nitrogen atom which is selected from melamine, trimethylol melamine, the compounds of formula (I) or formula (II) as described above, and mixtures thereof, are obtainable at a temperature ranging from 2 to 140° C., preferably from 25 to 120° C., more preferably from 40 to 100° C., and most preferably from 60 to 90° C. The skilled person in the art would know how to adjust the temperature and reaction time in the light of the description and examples herein described in order to complete the condensation reaction.

In accordance with certain particular embodiments, optionally in combination with one or more features of the various embodiments described above or below, the modified polymer polyols are obtainable by reaction of
the at least one compound bearing at least one basic-nitrogen atom a.1) which is selected from:
melamine, trimethylol melamine;
those compounds of formula (I) wherein R1 is selected from H, methyl, —CN, $CH_3CO$—, $NH_2$—CO—;
those compounds of formula (II) wherein R2 is selected from O=C<; S=C<; and R3 es H; and
mixtures thereof;
with
the mixture of condensation products a.3) obtainable at a temperature ranging from 2 to 140° C., preferably from 25 to 120° C., more preferably from 40 to 100° C., and most preferably from 60 to 90° C.

All the embodiments of the process of the invention contemplate all the combinations providing all the embodiments of the modified polymer polyol of the invention and combinations thereof.

In some examples, the volatile compounds present in the product may be removed from the product by any conventional method, such as vacuum distillation. In this distillation step the temperature may be raised in order to favor the removal of volatile compounds.

If required, the resulting modified polymer polyol may be used as is, or may be filtered to remove any large particles that may have been created.

The modified polymer polyol of the present invention, is a polyol which has finely dispersed particles of a polymer with high content of nitrogen and phosphorus. Accordingly, the polymeric particles dispersed in the at least one polyol have a phosphorus content content from 0.1 to 50 wt %; preferably from 5 to 40 wt % and most preferably from 10 to 35 wt %. The polymeric particles dispersed in the at least one polyol have a nitrogen content from 0.1 to 40 wt %; preferably from 5 to 40 wt % and most preferably from 7 to 30 wt %. In conjunction the sum of the content of nitrogen and phosphorus is from 0.1 to 90 wt %; preferably from 10 to 70 wt % and most preferably from 20 to 60 wt %.

In accordance with a particular embodiment of the present disclosure, the polymeric particles dispersed in the at least one base polyol, may be further oxidized using suitable oxidizing agents such as manganate, permanganate, peroxides and molecular oxygen; preferably the oxidizing agent is molecular oxygen and/or hydrogen peroxide.

The oxidation step is performed by introducing at least one oxidizing agent in the media once the polycondensation reaction has occurred. If hydrogen peroxide is used as oxidating agent, this one may be added in aqueous solution to the modified polymer polyol containing the stable dispersion of polymeric particles in the base polyol. If molecular oxygen is used as the oxidant, the oxidation may be done bubbling air into the system once the polymeric particles are formed.

The modified polymer polyol dispersion according to the present invention comprises polymeric particles of which at least 90% by volume has a particle size of 10 pm or less (particle size is measured using a mastersizer 3000, from Malvern Instruments, equipped with a hydro SM dispersion accessory, using ethanol as eluent); preferably the particle size is from 0.1 to 8 µm; more preferably from 0.4 to 3 µm, being particularly preferred from 0.5 to 1.5 µm.

The particle size distribution may be trimodal, bimodal, monomodal and also different independent distributions may be found.

The modified polymeric polyols of the present disclosure are useful for the preparation of polyurethane materials such as polyurethane foams, adhesives, elastomers, sealants and coatings; being preferred those with flame retardant properties.

The modified polymer polyols of the present invention, due to the presence of the dispersed polymeric particles with high content of P and N, provide flame retardancy properties to the polyurethane derived from its use. Besides, the presence of the dispersed polymeric particles with high content of P and N will provide enhanced oxidative, thermal and UV stability to the polyurethane derived from its use. This enhanced stability is specially useful for polyurethane foams in which scorching and discoloration will be reduced.

Additionally, the modified polymer polyols of the present invention show a reduced formaldehyde content. Thus, when used in the preparation of polyurethane foams, the resulting foams show a low formaldehyde release.

In the preparation of polyurethane foams, polyisocyanates, water and additives conventionally used in the manufacture of polyurethane foams may be used in combination with the modified polymer polyols of the present disclosure, in amounts and under reaction conditions which will vary depending on the type and desired properties of the polyurethane foam to be prepared. The skilled person knows different types of reactants, catalysts and conditions necessary to prepare polyurethane foams.

Thus, polyisocyanates which may be used in the preparation of the polyurethane foams in combination with the modified polymer polyols of the present disclosure are well known in the art. Examples of suitable isocyanates include the 4,4'-, 2,4' and 2,2'-isomers of diphenylmethane diisocynate (MDI), blends thereof and polymeric and monomeric MDI blends, toluene-2,4- and 2,6-diisocyanates (TDI), TDI/MDI blends may also be used.

The polyisocyanate may be used at an isocyanate index of from 60 to 140, preferably from 80 to 120 and most preferably from 90 to 110. The isocyanate index is defined as the ratio of isocyanate-groups over isocyanate-reactive hydrogen atoms present in a polyurethane formulation. Thus, the isocyanate index expresses the percentage of isocyanate actually used in a formulation with respect to the amount of isocyanate theoretically required for reacting with the amount of isocyanate-reactive hydrogen used in a formulation.

The blowing agent may be selected from any blowing agent commonly known in the art. The main blowing agent is the carbon dioxide generated by the decarboxylation of the carbamic acid generated by the reaction of water with the isocyanate. Alternative blowing agents (ABA) such as liquid carbon dioxide, methylene chloride, HCFC, pentane, etc. may be used according to legislation and targeted foam properties.

The blowing agent concentration in a expandable polymer composition is preferably comprised from 0% w/w to 120% w/w relative to total expandable polymeric mixture weight; more preferably from 0% w/w to 40% w/w; yet more preferably from 0 w/w to 10% w/w.

Any known catalyst may be used, including aminic compounds, such as triethylenediamine, N-methylmorpholine, N,N-dimethylcyclohexylamine, pentamethyldiethylenetriamine, tetramethylethylenediamine, bis(dimethylaminoethyl)ether, 1-methyl-4-dimethylaminoethyl-piperazine, 3-methoxy-N-dimethylpropylamine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Metal catalyst based on tin, zinc, bismuth and other metals may be used in the foam formulations such as for example tin octoate, tin dibutyldilaurate, zinc octoate, and other similar compounds.

The amount of catalysts may vary from 0 to 4% in the formulation; preferably in the range 0.05 to 2%, most preferably from 0.1 to 1%. Another option is the use of autocatalytic polyols, based on tertiary amine initiatiors, replacing the amine catalysts, hence reducing volatile organic compounds in the foam.

Among the additional additives which may be employed in preparing polyurethane polymers are fillers (for example, talc, silica, titania, magnesia, calcium carbonate, carbon black, graphite, magnesium silicate or clays such as kaolinite and montmorillinite); flame retardants (for example, halogenated flame retardants, such as hexabromocyclododecane and brominated polymers, or phosphorus flame retardants such as triphenylphosphate, dimethyl methylphosphonate, red phosphorus or aluminium diethyl phosphinate); acid scavengers (for example, calcium stearate, magnesium oxide, zinc oxide, tetrasodium pyrophosphate or hydrotalcite); antioxidants (for example, sterically hindered phenols, phosphites and mixtures thereof), and pigments and blowing agent stabilizers. A silicone surfactant may be necessary to stabilize the foam formulation, those products are available from the main actors of the market such as EVONIK, MOMENTIVE, AIR PRODUCTS, STRUKSILON, etc.

The polyurethane foam may be prepared by any known method. Thus, for example, the polyurethane foam may be formed by the so-called prepolymer method, in which a stoichiometric excess of the polyisocyanate is first reacted with the high equivalent weight polyol to form a prepolymer, which is in a second step reacted with a chain extender and/or water to form the desired foam. Frothing methods may also be suitable. The so-called one-shot methods may also be used. In such one-shot methods, the polyisocyanate and all isocyanate-reactive components are simultaneously brought together and caused to react. Three widely used one-shot methods which are suitable for use herein include slabstock foam processes, high resiliency slabstock foam processes, molded foam methods and box foam methods.

Slabstock foam may be prepared by mixing the foam ingredients and dispensing them into a trough or other pour plate where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun.

High resilience slabstock (HR slabstock) foam may be made in methods similar to those used to make conventional slabstock foam but using higher equivalent weight polyols.

Molded foam can be made according to the invention by transferring the reactants (polyol composition including copolyester, polyisocyanate, blowing agent, and surfactant) to a closed mold, made of steel, aluminum or epoxy resin, where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam.

Box foam method consists in discontinuous foam production performed either with a simple mixer used to mix the foam components previously weighted with a scale or machines able to dose and mix the quantity of each product needed to prepare a foam block, in both cases the liquid resulting from the mixture of all components is being poured into a mould which defined the block size.

In accordance with the present disclosure, any type of flexible (conventional, high resilience, viscoelastic foams), semi-flexible or rigid polyurethane foams may be prepared using the modified polymer polyols of the present disclosure provided that the polyurethanes foam forming reactants, catalysts and additives are selected and processed in an appropriate known manner.

Polyurethane foams prepared from the modified polymer polyols of the present disclosure show a density from 4 to 120 kg/m$^3$, preferably 15 to 80 kg/m$^3$, most preferably 20 to 60 kg/m$^3$.

Using the modified polymer polyols of the present disclosure in the preparation of polyurethane foams results in the improvement of the fire retardant and resistance to thermal ageing properties of the foams thus obtained. Therefore, depending on the required burning test, the polyurethane foams obtained might not require any other fire retardant additive, although any additional known flame retardants additives may be used in the preparation of the polyurethane foams in combination with the modified polymer polyols of the present disclosure.

Using the modified polymer polyols of the present disclosure in the preparation of polyurethane foams results in foams which retain fire retardant properties longer than foams prepared with liquid fire retardant additives, avoiding the known migration problems thereof.

The modified polymer polyols according to the present disclosure show relative low viscosity, and a high phosphorus and nitrogen content. Thus, the modified polymer polyols are particularly useful in the preparation of polyurethane foams with improved fire retardant properties and reduced solids content.

Furthermore, the use of modified polymer polyols of the present disclosure in rigid foams reduces the values of thermal conductivity of the foams improving the insulation capacity of the foam.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

As used herein, the following terms shall have the following meanings:

In the context of the present invention, the term "iOH" refers to the hydroxyl number (iOH), defined as the number of milligrams of potassium hydroxide required for the complete hydrolysis of the fully phthalylated derivative prepared from 1 gram of polyol. The hydroxyl number is determined according to ASTM D4274-16.

The term "functionality", when referring to base polyols, is used herein to indicate the number average functionality (number of hydroxyl groups per molecule) of the polyol composition, on the assumption that it is the number average functionality (number of active hydrogen atoms per molecule) of the initiator(s) used in their preparations. Although in practice the real functionality will often be somewhat less because of some terminal unsaturation, for the purpose of characterizing the base polyols, the functionality of the polyol is the functionality of the initiator(s) used for its preparation.

In the context of the present invention, the term "molecular weight" of the polyol is calculated using the following equation $$MW\ polyol = \frac{56.1 \times functionality}{Hydroxyl\ number\ (iOH)} \times 1000$$

wherein "functionality" represents the functionality of the polyol, i.e. the average number of hydroxyl groups per molecule of polyol; and hydroxyl number (iOH) is calculated according to ASTM D4274-16.

The free formaldehyde content in the modified polymer polyol dispersion as described herein, is determined by reacting the modified polymer polyol with 2,4-dinitrophenylhydrazine (DNPH), and the resulting solution is analyzed by HPLC, the product resulting from the reaction between formaldehyde and DNPH is quantified using a UV-detector.

In a particular embodiment, the method for the determination of the free formaldehyde comprises reacting the sample with 2,4-dinitrophenylhydrazine (DNPH) according to the following procedure. 20 mL of a DNPH solution in acetonitrile (1 g of DNPH in 1000 mL of acetonitrile) and 2 mL of a phosphoric acid solution in acetonitrile (1 ml of phosphoric acid (85%) in 100 mL of acetonitrile) are added to 1 g of polyol. The mixture is stirred under reflux for 1 h. The product is cooled down and filtered through a 0.22 syringe filter. The resulting solution is analyzed by HPLC using a zorbax eclipse plus C-18 column with a mixture water/acetonitrile (40/60) as eluent. The formaldehyde-DNPH is quantified using a UV detector ($\lambda=360$ nm).

Formaldehyde emmisions from polyurethane foams is determined according to the international standard UNE-ISO 16000-[Items 3, 9 and 11] following the indications of the CertiPUR Label for Flexible Polyurethane Foams.

In the context of the present disclosure, the term "percentage (wt %) by weight" refers to the percentage of each ingredient of the combination or composition in relation to the total weight.

All the embodiments of the process of the present disclosure contemplate all the combinations providing all the embodiments of the extract of the invention and combinations thereof.

The modified polymer polyol "obtainable by" the process of the invention is used here to define the modified polymer polyol by the process for obtaining it and refers to the product obtainable by the preparation as defined herein. For the purposes of the invention the expressions "obtainable", "obtained" and equivalent expressions are used interchangeably, and in any case, the expression "obtainable" encompasses the expression "obtained".

For the purposes of the invention, any ranges given include both the lower and the upper end-points of the range. Ranges given, such as concentrations, temperatures, times, sizes, and the like, should be considered approximate, unless specifically stated.

Throughout the description and claims the word "comprise" and variations of the word, are not intended to exclude other technical features, additives, components, or steps.

Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular and preferred embodiments described herein.

The following examples are provided to illustrate the embodiments of the invention, but are not intended to limit the scope thereof. All parts and percentages are by weight unless otherwise indicated.

EXAMPLES

The following materials were used:

Polyol A—A glycerol (functionality 3) initiated polyether polyol (PO/EO) with a hydroxyl number of 28 mgKOH/g, a content of polyethylene oxide terminal blocks of 14 wt %, >78% of primary OH groups and a viscosity at 25° C. of 1100 mPa s Polyol B—A polymeric polyether polyol based on styrene/acrylonitrile compolymer (SAN) dispersed in a glycerol (functionality 3) initiated polyether polyol (PO/EO) with a hydroxyl number of 35 mgKOH/g and a content of polyethylene oxide terminal blocks of 18 wt %. The solids content is 25%, the hydroxyl number of 26 mgKOH/g and the viscosity at 25° C. is 2600 mPa s.

THPS—Tetrakis(hydroxymethyl)phosphonium sulphate salt (70-75 wt % in water). Available from Sigma Aldrich.

KOH—Potassium hydroxide (85%). Available from Sigma Aldrich.

DEOA—N,N-Diethanolamine (99.0%). Available from Sigma Aldrich.

CA—Aqueous solution of Cyanamide (50 wt % in water). Available from Sigma Aldrich.

UR—Urea (98%). Available from Sigma Aldrich.

Tegoamin® 33—A solution of 33 wt % triethylene diamine in dipropyleneglycol available from Evonik Industries.

Ortegol®-204—Crosslinking agent with a delayed reaction, specially designed for the production of HR slabstock foams available from Evonik Industries.

Tegoamin® BDE—Solution of 70% Bis(2-dimethylaminoethyl)ether in dipropyleneglycol available from Evonik Industries.

Tegostab® B 8681—Silicone surfactant for polyurethane foam available from Evonik industries.

Jeffamine M2005 polyetheramine is a nominal 2000 molecular weight monoamine with a PO/EO ratio of about 29/6 available from Huntsman.

TDI-80—Toluene diisocyanate (80/20).

Kosmos®-29—Tin Octoate available from Evonik Industries.

Comparative Example 1

Comparative Example with Patent Application PCT/EP2018/068391

100 g of THPS (tetrakis(hydroxymethyl) phosphonium sulfate solution (75%)) were placed in a glass reactor equipped with a mechanical stirrer. A solution of KOH (24.7 g of KOH in 75 mL of Ethanol) was added slowly over the THPS, resulting in the precipitation of potassium sulfate. After complete precipitation, the sulfate salt was filtered out. The composition (mol %) of the different phosphorus based species was determined by 31P-NMR.

Table 1 shows the composition of the different phosphorus based species. Other minor components may be present.

TABLE 1

| mol % | | | | | |
|---|---|---|---|---|---|
| THPO | THPS | THP | m-THP | d-THP | t-THP |
| 12.4 | 0 | 87.6 | 0 | 0 | 0 |

The resulting product was diluted with 100 mL of water and was added to a reactor, containing 500 g of polyol A, under vigorous stirring. The stirring was maintained for 10 minutes and then 43.75 ml of cyanamide solution (50 wt % in water) were added. The reaction was kept under stirring for 1 hour and then the volatiles were distilled off under reduced pressure following different steps 1.—The pressure was reduced, at room temperature, bellow 10 mbar and kept at these conditions for 30 min.
2.—Temperature was raised to 60° C., maintaining the pressure bellow 10 mbar, and was kept at these conditions for 15 min.
3.—Temperature was raised to 80° C., maintaining the pressure bellow 10 mbar, and was kept at these conditions for 15 min.
4.—Temperature was raised to 100° C., maintaining the pressure bellow 10 mbar, and was kept at these conditions for 15 min.
5.—Temperature was raised to 120° C., maintaining the pressure bellow 10 mbar, and was kept at these conditions for 30 min.

The product obtained is a white modified polymer polyol with a free formaldehyde content of 557 ppm. The product is stable and does not precipitate.

Comparative Example 2

20 g of THPS (tetrakis(hydroxymethyl) phosphonium sulfate solution (75%)) were placed in a glass reactor equipped with a mechanical stirrer. A solution of KOH (4.44 g of KOH in 20 mL of Methanol) was added slowly over the THPS, resulting in the precipitation of potassium sulphate. After complete precipitation, the sulphate salt was filtered out and the volatile compounds of the resulting solution were distilled off in a rotavapor at a temperature of 100° C. and 25 mbar of pressure for 1 hour.

The % molar distribution of the different THP derivatives was determined by 31P-NMR.

Table 2 shows the composition of the different phosphorus based species. Other minor components may be present.

TABLE 2

| mol % | | | | | |
|---|---|---|---|---|---|
| THPO | THPS | THP | m-THP | d-THP | t-THP |
| 4.4 | 0 | 70.4 | 22.8 | 2.3 | 0.1 |

The product obtained after the distillation of volatile compounds was diluted with 20 mL of water and then was added to a reactor, containing 100 g of Polyol A, under vigorous stirring. The stirring was maintained for 10 minutes and then 8.75 ml of cyanamide solution (50 wt % in water) were added. The reaction was kept under stirring for 1 hour and then the volatiles were distilled off under reduced pressure following the procedure described in example 1.

The product obtained is an orange modified polymer polyol with a formaldehyde content of 12 ppm. The product is not stable and precipitates within one week.

Comparative Example 3

The mixture of THP derivatives was prepared as described in example 2. The product obtained after the distillation of volatile compounds was diluted with 20 mL of water and then was added to a reactor, containing 100 g of polyol A, under vigorous stirring. The stirring was maintained for 10 minutes and then 5.84 ml of cyanamide solution (50 wt % in water) were added. The reaction was kept under stirring for 1 hour and then the volatiles were distilled off under reduced pressure following the procedure described in example 1.

The product obtained is a yellow modified polymer polyol with a formaldehyde content of 24 ppm. The product is not stable and precipitates within one week.

Comparative Example 4

20 g of THPS (tetrakis(hydroxymethyl) phosphonium sulfate solution (75%)) were placed in a glass reactor equipped with a mechanical stirrer. A solution of KOH (3.95 g of KOH in 20 mL of Ethanol) was added slowly over the THPS, resulting in the precipitation of potassium sulfate. After complete precipitation, the sulfate salt was filtered out and the volatile compounds of the resulting solution were distilled off in a rotavapor at a temperature of 50° C. and 25 mbar of pressure for 2 hour. The composition (mol %) of the different THP derivatives was determined by 31P-NMR.

Table 3 shows the composition of the different phosphorus based species. Other minor components may be present.

TABLE 3

| mol % | | | | | |
|---|---|---|---|---|---|
| THPO | THPS | THP | m-THP | d-THP | t-THP |
| 6.8 | 23.1 | 40.3 | 24.6 | 4.7 | 0.3 |

The product obtained after the distillation of volatile compounds was diluted with 20 mL of water and then was added to a reactor, containing 100 g of Polyol A, under vigorous stirring. The stirring was maintained for 10 minutes and then 5.84 ml of cyanamide solution (50 wt % in water) were added. The reaction was kept under stirring for 1 hour and then the volatiles were distilled off under reduced pressure following the procedure described in example 1.

The product obtained is a yellow modified polymer polyol with a formaldehyde content of 73 ppm. The product is not stable and precipitates within one week.

Comparative Example 5

A solution of KOH with a concentration of 0.1728 g/mL was prepared by dissolving 72.91 g of KOH in 360 ml of methanol. 329 mL of this solution were added slowly over 300.2 g of THPS solution (75%). After complete precipitation, the sulphate salt was filtered out and the filter cake was washed with additional 400 ml of pure methanol. The distillation of the volatile compounds was performed using a short path distillation device (model "KDL5", manufactured by UIC GmbH), under the conditions of a temperature of heating surface (temperature of thin film) of 130° C., a pressure of 11-16 kPa, a rotor revolution of 300 rpm, and a feeding rate of about 25 mL/minute to perform the thin film distillation. The % molar distribution of the different THP derivatives was determined by 31P-NMR.

Table 4 shows the composition of the different phosphorus based species. Other minor components may be present.

TABLE 4

| mol % | | | | | |
|---|---|---|---|---|---|
| THPO | THPS | THP | m-THP | d-THP | t-THP |
| 12.3 | 5.2 | 78.6 | 1.2 | 0.0 | 0.0 |

4.65 g of the mixture of phosphorus compounds, prepared in this example, were diluted with 5 mL of water and then was added to a reactor, containing 50 g of Polyol A, under vigorous stirring. The stirring was maintained for 10 minutes and then a solution of urea in water (3.38 g of urea in 5 ml of water) was added. The reaction was kept under stirring for 1 hour and then the volatiles were distilled off under reduced pressure following the procedure described in example 1.

The product obtained is a pale-yellow modified polymer polyol with a formaldehyde content of 15 ppm. The product is not stable and precipitates within one week.

Comparative Example 6

A solution of KOH with a concentration of 0.1629 g/mL was prepared by dissolving 146.3 g of KOH in 720 ml of methanol. 349 mL of this solution were added slowly over 300.5 g of THPS solution (75%). After complete precipitation, the sulphate salt was filtered out, the filter cake was washed with additional 100 ml of pure methanol. The distillation was performed using a short path distillation device (model "KDL5", manufactured by UIC GmbH), under the conditions of a temperature of heating surface (temperature of thin film) of 130° C., a pressure of 11 mbar, a rotor revolution of 300 rpm, and a feeding rate of about 10 mL/minute to perform the thin film distillation. The % molar distribution of the different THP derivatives was determined by 31P-NMR.

Table 5 shows the composition of the different phosphorus based species. Other minor components may be present.

TABLE 5

| mol % | | | | | |
|---|---|---|---|---|---|
| THPO | THPS | THP | m-THP | d-THP | t-THP |
| 12.8 | 2.5 | 82.2 | 1.1 | 0.0 | 0.0 |

4.65 g of the mixture of phosphorus compounds, prepared in this example, were diluted with 5 mL of water and then was added to a reactor, containing 50 g of Polyol A, under vigorous stirring. The stirring was maintained for 10 minutes and then a solution of urea in water (2.25 g of urea in 5 ml of water) was added. The reaction was kept under stirring for 1 hour and then the volatiles were distilled off under reduced pressure following the procedure described in example 1.

The product obtained is a pale-yellow modified polymer polyol with a formaldehyde content of 18 ppm. The product is not stable and precipitates within one week.

Working Example 1

According to the Invention

A solution of KOH with a concentration of 0.172 g/mL was prepared by dissolving 87.1 g of KOH in 420 ml of ethanol. 320 mL of this solution was added slowly over 325.2 g of THPS solution (76.1%). After complete precipitation, the sulfate salt was filtered out and the filter cake was washed with additional 100 ml of pure ethanol. The distillation was performed using a rotavapor. The filtered solution was poured into a 1 L flask and introduced into a hot oil bath setted at 100° C. for one hour while pressure was gradually reduced until 50 mbar. 147 g of product were collected.

Table 6 shows the composition of the different phosphorus based species. Other minor components may be present.

TABLE 6

| mol % | | | | | |
|---|---|---|---|---|---|
| THPO | THPS | THP | m-THP | d-THP | t-THP |
| 7.8 | 3.9 | 61.6 | 24.0 | 2.5 | 0.1 |

A solution of THP derivatives and urea was prepared by mixing 46.50 g of the mixture of phosphorus compounds, prepared in this example, 33.76 g of urea and 50 mL of water. This solution was added, under vigorous stirring, into a reactor containing a mixture, previously heated at 100° C., of polyol Polyol A (500 g) and Jeffamine M2005 (20 g). After 10 minutes of stirring, vacuum was applied in order to remove volatiles from the reaction media. After 30 minutes, the temperature was raised to 120° C. under vacuum (50-100 mbar). Finally the temperature was raised to 140° C. an maintained at this temperature under vacuum (50-100 mbar) for 1 hour.

The product obtained is a white modified polymer polyol with a formaldehyde content of 73 ppm. The product is stable and does not precipitate.

Working Example 2

According to the Invention

A solution of KOH with a concentration of 0.1808 g/mL was prepared by dissolving 87.04 g of KOH pellets (Sigma Aldrich) in 420 ml of ethanol. 320 mL of this solution was added slowly over 325.2 g of THPS solution (76.1%). After complete precipitation, the sulfate salt was filtered out and the filter cake was washed with additional 100 ml of pure ethanol. The distillation was performed using a short path distillation device (model "KDL5", manufactured by UIC GmbH), under the conditions of a temperature of heating surface (temperature of thin film) of 130° C., a pressure of 10-11 mbar, a rotor revolution of 300 rpm, and a feeding rate of about 10 mL/minute to perform the thin film distillation. 101 g of product were collected.

Table 7 shows the composition of the different phosphorus based species. Other minor components may be present.

TABLE 7

| mol % | | | | | |
|---|---|---|---|---|---|
| THPO | THPS | THP | m-THP | d-THP | t-THP |
| 17.3 | 7.1 | 71.8 | 0.4 | 0.0 | 0.0 |

A solution of THP derivatives and urea was prepared by mixing 46.50 g of the mixture of phosphorus compounds, prepared in this example, 33.76 g of urea and 50 mL of water. This solution was added, under vigorous stirring, into a reactor containing a mixture, previously heated at 100° C., of polyol Polyol A (500 g) and Jeffamine M2005 (20 g). After 10 minutes of stirring, vacuum was applied in order to remove volatiles from the reaction media. After 30 minutes, the temperature was raised to 120° C. under vacuum (50-100 mbar). Finally the temperature was raised to 140° C. an maintained at this temperature under vacuum (50-100 mbar) for 1 hour.

The product obtained is a white-yellow modified polymer polyol with a formaldehyde content of 26 ppm. The product is stable and does not precipitate.

Example A

Preparation of Polyurethane Foams

A batch was prepared mixing water, amines, DEOA and Ortegol 204 according to the foam formulation shown in the table 13. Polyols and silicone were mixed for 50 seconds at 5000 rpm into a cardboard glass. The corresponding quantity of batch was added to the mixture, and after 5 seconds the tin octoate was added and stirred for 5 more seconds. Then the isocyanate was added and stirring was maintained for 10 seconds.

The resulting mixture was poured into a 30.4×21.8×16.7 cm aluminum mold protected by kraft paper at 23° C. and the mixture was allowed to react in the mold for a period of 5 minutes, rise profile was monitored by a Foamat equipment. The resulting foam was removed from the mold, and allowed to cure in an oven at 100° C. for 15 minutes. After that curing step the foam was storaged at 23° C. and 50% relative humidity for at least 24 h.

Table 8 shows the compositions of a PU foam comparative example 1, and PU foam working examples 1 and 2.

TABLE 8

| | PU foam Comparative example | PU foam Working examples | |
|---|---|---|---|
| | 1 | 1 | 2 |
| | | p.b.w. | |
| Polyol A | 0 | 0 | 0 |
| Polyol B | 25 | 25 | 25 |
| Comp Example 1 | 75 | 0 | 0 |
| Working Example 1 | 0 | 75 | 0 |
| Working Example 2 | 0 | 0 | 75 |
| Total Water | 3 | 3 | 3 |
| DEOA | 0.50 | 0.50 | 0.50 |
| Tegoamin 33 | 0.15 | 0.15 | 0.15 |
| Tegoamin BDE | 0.05 | 0.05 | 0.05 |
| ORTEGOL-204 | 1.00 | 1.00 | 1.00 |
| Kosmos ® 29 | 0.15 | 0.15 | 0.15 |

TABLE 8-continued

|  | PU foam Comparative example | PU foam Working examples | |
|---|---|---|---|
|  | 1 | 1 | 2 |
|  |  | p.b.w. |  |
| Tegostab ® B-8681 | 0.30 | 0.30 | 0.30 |
| TDI-80 | Index 100 | Index 100 | Index 100 |

Polyurethane foams. Formaldehyde release.

The foams were analyzed following the standard UNE-ISO 16000-[Items 3, 9 and 11] following the indications of the CertiPUR Label for Flexible Polyurethane Foams.

The release of formaldehyde from the foams is shown in the following table 9:

TABLE 9

|  | PU foam Comp. Example 1 | Working example 1 | Working example 2 |
|---|---|---|---|
| Formaldehyde release (μg/m³) | 298.1 | 8.6 | 14.0 |

The invention claimed is:

1. A stable modified polymer polyol dispersion of polymeric particles in a liquid polyol mixture, the stable modified polymer polyol dispersion is obtainable by a process comprising the preparation of polymeric particles, in the presence of the liquid polyol mixture, by
   a. reacting in the liquid polyol mixture and under polymerisation conditions
      at least one compound bearing at least one basic-nitrogen atom a.1) characterized by the presence in the molecule of at least one hydrogen atom attached to a nitrogen atom;
      with
      a mixture of compounds bearing a phosphorus atom a.2) comprising [bis(hydroxymethyl)phosphanyl]methanol (THP), a tetrakis(hydroxymethyl) phosphonium salt (THPX), [bis(hydroxymethyl)phosphoryl]methanol (THPO), ({[bis(hydroxymethyl)phosphanyl]methoxy}methanol (mTHP), {bis[(hydroxymethoxy)methyl]phosphanyl}methanol (dTHP), ({bis[(hydroxymethoxy)methyl]phosphanyl}methoxy)methanol (tTHP)), bis(hydroxymethyl)phosphorylmethoxymethanol (mTHPO), {bis[(hydroxymethoxy)methyl]phosphoryl}methanol (dTHPO) and ({bis[(hydroxymethoxy)methyl]phosphoryl}methoxy)methanol (tTHPO);
      or
      the mixture of condensation products a.3) resulting from the reaction of the mixture of compounds bearing a phosphorus atom a.2) as described above and at least one compound bearing at least one basic nitrogen atom a.1);
   wherein the compound bearing at least one basic-nitrogen atom a.1) is selected from
      melamine, trimethylol melamine, a compound of formula (I), a compound of formula (II); and mixtures thereof;
   wherein the compound of formula (I) is as follows $R_1$—$NH_2$   (I)

wherein $R_1$ is selected from —H, —($C_1$-$C_3$)Alkyl, ($C_1$-$C_3$)Alkyl-CO—, $NH_2$—CO—, —$(CH_2)_n$—$NH_2$, —CN, —$NH_2$, —$SO_2NH_2$, cyclohexyl, phenyl, —$SO_2OH$ and —NHCONHNH$_2$; wherein n is an integer selected from 1-18;

and the compound of formula (II) is as follows:

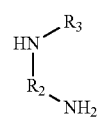

(II)

wherein $R_2$ is selected from NH═C<, O═C<, and S═C<; and $R_3$ is selected from H, —CN, —$NH_2$, —CONH$_2$, —CONHCONH$_2$, and —CONHCONHCONH$_2$;

wherein the liquid polyol mixture comprises at least one base polyol and at least one monofunctional polyetheramine, the monofunctional polyetheramine having a propylene oxide content selected from 30-99 wt %.

2. The stable modified polymer polyol according to claim 1, being obtainable by a process comprising the preparation of polymeric particles, in the presence of the liquid polyol mixture, by reaction of the at least one compound bearing at least one basic-nitrogen atom a.1) which is selected from
      melamine, trimethylol melamine, the compound of formula (I), the compound of formula (II); and mixtures thereof;
   with
   the mixture of compounds bearing a phosphorus atom a.2) comprising
   I. [bis(hydroxymethyl)phosphanyl]methanol (THP) in a concentration selected from 0-99.9 mol %,
   II. a tetrakis(hydroxymethyl) phosphonium salt (THPX) in a concentration selected from 0-50 mol %,
   III. [bis(hydroxymethyl)phosphoryl]methanol (THPO) in a concentration selected from 0-99.9 mol %,
   IV. {[bis(hydroxymethyl)phosphanyl]methoxy}methanol (mTHP) in a concentration selected from 0-80 mol %,
   V. {bis[(hydroxymethoxy)methyl]phosphanyl}methanol (dTHP) in a concentration selected from 0-30 mol %,
   VI. ({bis[(hydroxymethoxy)methyl]phosphanyl}methoxy)methanol (tTHP) in a concentration selected from 0-15 mol %,
   VII. bis(hydroxymethyl)phosphorylmethoxymethanol (mTHPO) in a concentration selected from 0-20 mol %,
   VIII. {bis[(hydroxymethoxy)methyl]phosphoryl}methanol (dTHPO) in a concentration selected from 0-10 mol %, and
   IX. ({bis[(hydroxymethoxy)methyl]phosphoryl}methoxy)methanol (tTHPO) in a concentration selected from 0-4 mol %;
   being the sum total of phosphorus containing components of the mixture 100 mol %.

3. The stable modified polymer polyol according to claim 1, wherein the mixture of compounds bearing a phosphorus atom a.2) comprises:
  I. [bis(hydroxymethyl)phosphanyl]methanol (THP) in a concentration selected from 35-85 mol %,
  II. a tetrakis(hydroxymethyl) phosphonium salt (THPX) in a concentration selected from 0-30 mol %,
  III. [bis(hydroxymethyl)phosphoryl]methanol (THPO) in a concentration selected from 1-15 mol %,
  IV. {[bis(hydroxymethyl)phosphanyl]methoxy}methanol (mTHP) in a concentration selected from 0.4-40 mol %,
  V. {bis[(hydroxymethoxy)methyl]phosphanyl}methanol (dTHP) in a concentration selected from 0-30 mol %,
  VI. ({bis[(hydroxymethoxy)methyl]phosphanyl}methoxy)methanol (tTHP) in a concentration selected from 0-15 mol %,
  VII. bis(hydroxymethyl)phosphorylmethoxymethanol (mTHPO) in a concentration selected from 0-20 mol %,
  VIII. {bis[(hydroxymethoxy)methyl]phosphoryl}methanol (dTHPO) in a concentration selected from 0-10 mol %, and
  IX. ({bis[(hydroxymethoxy)methyl]phosphoryl}methoxy)methanol (tTHPO) in a concentration selected from 0-4 mol %;
    being the sum total of phosphorus containing components of the mixture 100 mol %.

4. The stable modified polymer polyol according to claim 1, being obtainable by a process comprising the preparation of polymeric particles, in the presence of the liquid polyol mixture, by reaction of:
  the at least one compound bearing at least one basic-nitrogen atom a.1) which is selected from
    melamine, trimethylol melamine, the compound of formula (I), the compound of formula (II); and mixtures thereof;
  with
  the mixture of condensation products a.3).

5. The stable modified polymer polyol according to claim 1, wherein the base polyol is an ethylene oxide capped polyether polyol having a proportion of terminal primary hydroxyl groups selected from 35-99.9%, and a content of polyethylene oxide terminal blocks selected from 5-20 wt %.

6. The stable modified polymer polyol according to claim 1, wherein the base polyol is an ethylene oxide capped polyether polyol having a proportion of terminal primary hydroxyl groups selected from 35-99.9%, a content of polyethylene oxide terminal blocks of 5-20 wt % and a OH functionality from 2 to 8; and wherein the monofunctional polyetheramine has a propylene oxide content selected from 80-90 wt %, and a propylene oxide to ethylene oxide mol ratio selected from 4.5:1 to 12:1.

7. A process for the preparation of a stable modified polymer polyol dispersion, the process comprising mixing simultaneously or sequentially in any order:
  I. a polymeric particle precursor comprising
    a) the mixture of the at least one compound bearing at least one basic-nitrogen atom a.1); and
    b) at least one of the group consisting of the mixture of compounds bearing a phosphorus atom a.2) and the mixture of condensation products a.3) as defined in claim 1;
  II. at least one base polyol;
  III. at least one monofunctional polyetheramine having a propylene oxide content selected from 30-99 wt %.

8. The process according to claim 7 which comprises
  a) mixing the at least one base polyol with the at least one monofunctional polyetheramine, thus obtaining a liquid polyol mixture; and
  b) preparing the polymeric particles by adding to the liquid polyol mixture, obtained in a), simultaneously or sequentially in any order
    the at least one compound a.1) bearing at least one basic-nitrogen atom characterized by the presence in the molecule of at least one hydrogen atom attached to a nitrogen atom and is selected from melamine, trimethylol melamine, the compound of formula (I), the compound of formula (II), and mixtures thereof; and
    the mixture of compounds bearing a phosphorus atom a.2) or the mixture of condensation products a.3).

9. The process according to claim 8, wherein the mixture of compounds bearing a phosphorus atom a.2) comprises
  I. [bis(hydroxymethyl)phosphanyl]methanol (THP) in a concentration selected from 0-99.9 mol %,
  II. a tetrakis(hydroxymethyl) phosphonium salt (THPX) in a concentration selected from 0-50 mol %,
  III. [bis(hydroxymethyl)phosphoryl]methanol (THPO) in a concentration selected from 0-99.9 mol %,
  IV. {[bis(hydroxymethyl)phosphanyl]methoxy}methanol (mTHP) in a concentration selected from 0-80 mol %,
  V. {bis[(hydroxymethoxy)methyl]phosphanyl}methanol (dTHP) in a concentration selected from 0-30 mol %,
  VI. ({bis[(hydroxymethoxy)methyl]phosphanyl}methoxy)methanol (tTHP) in a concentration selected from 0-15 mol %;
  VII. bis(hydroxymethyl)phosphorylmethoxymethanol (mTHPO) in a concentration selected from 0-20 mol %,
  VIII. {bis[(hydroxymethoxy)methyl]phosphoryl}methanol (dTHPO) in a concentration selected from 0-10 mol %, and
  IX. ({bis[(hydroxymethoxy)methyl]phosphoryl}methoxy)methanol (tTHPO) in a concentration selected from 0-4 mol %;
    being the sum total of phosphorus containing components of the mixture 100 mol %.

10. The process according to claim 8 wherein the process comprises:
  i) mixing at least one hydroxyalkylphosphonium salt (THPX) with an aqueous or alcoholic solution of a base;
  ii) optionally filtering out the resulting solution;
  iii) distilling off the solvent and volatiles, thus obtaining the mixture a.2) of compounds bearing a phosphorus atom;
  iv) optionally filtering out the resulting solution;
  v) optionally oxidizing the product obtained in iii) or the solution obtained in iv);
  vi) mixing the at least one base polyol with the at least one monofunctional polyetheramine, thus obtaining the liquid polyol mixture;
  vii) preparing the polymeric particles in the presence of the liquid polyol mixture obtained in vii by the reaction resulting from adding to the liquid polyol mixture obtained in vi), simultaneously or sequentially in any order
    the at least one compound a.1) bearing at least one basic-nitrogen atom characterized by the presence in the molecule of at least one hydrogen atom attached to a nitrogen atom and is selected from melamine, trimethylol melamine, the compound of formula (I), the compound of formula (II), and mixtures thereof; and the mixture a.2) of compounds bearing a phosphorus atom obtained in iii) or iv), the oxidized mixture obtained in v), or mixtures thereof mixtures thereof.

11. The process according to claim 7, wherein the mixture of compounds bearing a phosphorus atom a.2) comprises:
I. [bis(hydroxymethyl)phosphanyl]methanol (THP) in a concentration selected from 35-85 mol %,
II. a tetrakis(hydroxymethyl) phosphonium salt (THPX) in a concentration selected from 0-30 mol %,
III. [bis(hydroxymethyl)phosphoryl]methanol (THPO) in a concentration selected from 1-15 mol %,
IV. {[bis(hydroxymethyl)phosphanyl]methoxy}methanol (mTHP) in a concentration selected from 0.4-40 mol %,
V. {bis[(hydroxymethoxy)methyl]phosphanyl}methanol (dTHP) in a concentration selected from 0-30 mol %,
VI. ({bis[(hydroxymethoxy)methyl]phosphanyl}methoxy)methanol (tTHP) in a concentration selected from 0-15 mol %,
VII. bis(hydroxymethyl)phosphorylmethoxymethanol (mTHPO) in a concentration selected from 0-20 mol %,
VIII. {bis[(hydroxymethoxy)methyl]phosphoryl}methanol (dTHPO) in a concentration selected from 0-10 mol %,
IX. ({bis[(hydroxymethoxy)methyl]phosphoryl}methoxy)methanol (tTHPO) in a concentration selected from 0-4 mol %;
X. optionally at least one other compound bearing a phosphorus atom;
being the sum total of phosphorus containing components of the mixture 100 mol %;
wherein the compound a.1) bearing at least one basic-nitrogen atom is selected from:
melamine, trimethylol melamine;
the compound of formula (I) wherein R1 is selected from H, methyl, —CN, $CH_3$—CO—, and $NH_2$—CO—; and
the compound of formula (II) wherein R2 is selected from O═C<; and S═C<; and R3 is H;
and mixtures thereof;
wherein the base polyol is an ethylene oxide capped polyether polyol having a content of terminal primary hydroxyl groups selected from 35-99.9%, a content of polyethylene oxide terminal blocks of 5-20 wt % and a OH functionality selected from 2 to 8; and
wherein the monofunctional polyetheramine has a propylene oxide content selected from 80-90 wt %, and a propylene oxide to ethylene oxide mol ratio selected from 4.5:1 to 12:1.

12. The process according to claim 7, wherein the process comprises:
i) mixing at least one tetrakis(hydroxymethyl) phosphonium salt (THPX) with an aqueous or alcoholic solution of a base;
ii) optionally filtering out the resulting solution;
iii) distilling off the solvent and volatiles, thus obtaining the mixture a.2) of compounds bearing a phosphorus atom;
iv) optionally filtering out the resulting solution;
v) optionally oxidizing the product obtained in iii or the solution obtained in iv;
vi) reacting
the mixture of compounds a.2) obtained in iii) or iv), the oxidized mixture as obtained in v) or mixtures thereof, with
at least one compound a.1) bearing at least one basic-nitrogen atom characterized by the presence in the molecule of at least one hydrogen atom attached to a nitrogen atom and is selected from melamine, trimethylol melamine, the compound of formula (I), the compound of formula (II), and mixtures thereof, thus obtaining a mixture of condensation products a.3);
vii) mixing the at least one base polyol with the at least one monofunctional polyetheramine, thus obtaining the liquid polyol mixture;
viii) preparing the polymeric particles in the presence of the liquid polyol mixture obtained in vii) by the reaction resulting from adding to the liquid polyol mixture obtained in vii), simultaneously or sequentially in any order
the at least one compound a.1) bearing at least one basic-nitrogen atom characterized by the presence in the molecule of at least one hydrogen atom attached to a nitrogen atom and is selected from melamine, trimethylol melamine, the compound of formula (I), the compound of formula (II), and mixtures thereof; and
the mixture of condensation products a.3) obtained in vi).

13. A process for preparing a polyurethane material wherein at least one polyisocyanate is reacted with an isocyanate-reactive component which comprises at least one modified polymer polyol as defined in claim 1.

14. A polyurethane material obtainable by a process according to claim 13.

15. A method for the preparation of a polyurethane foam with a formaldehyde emission comprised bellow 100 (µg/m³) as measured by the international standard UNE-ISO 16000-[Items 3, 9 and 11] following the indications of the CertiPUR Label for Flexible Polyurethane Foams, the method comprises the use of the stable modified polymer polyol as described in claim 1.

* * * * *